US012775916B2

(12) United States Patent
Mason

(10) Patent No.: US 12,775,916 B2
(45) Date of Patent: Oct. 27, 2026

(54) PLUMBING MONITORING SYSTEM WITH PROGRESSIVE MAINTENANCE AND ENHANCEMENT ASSISTANCE

(71) Applicant: NIBCO Inc., Elkhart, IN (US)

(72) Inventor: Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 145 days.

(21) Appl. No.: 18/211,897

(22) Filed: Jun. 20, 2023

(65) Prior Publication Data

US 2024/0428202 A1 Dec. 26, 2024

(51) Int. Cl.

| | |
|---|---|
| ***G06Q 30/00*** | (2023.01) |
| ***E03B 7/07*** | (2006.01) |
| ***G06Q 10/20*** | (2023.01) |
| ***G06Q 50/06*** | (2012.01) |

(52) U.S. Cl.

CPC ............... *G06Q 10/20* (2013.01); *E03B 7/07* (2013.01); *G06Q 50/06* (2013.01)

(58) Field of Classification Search

CPC ........... G06Q 10/20; G06Q 50/06; E03B 7/07

See application file for complete search history.

(56) References Cited

U.S. PATENT DOCUMENTS

| | | | |
|---|---|---|---|
| 5,971,011 A | 10/1999 | Price | |
| 6,102,061 A | 8/2000 | Addink | |
| 6,298,285 B1 | 10/2001 | Addink et al. | |
| 6,520,003 B1 | 2/2003 | Fox | |
| 6,556,924 B1 * | 4/2003 | Kariyawasam | G06Q 10/04 285/15 |
| 6,657,552 B2 | 12/2003 | Belski et al. | |
| 6,944,523 B2 | 9/2005 | Addink et al. | |
| 6,963,808 B1 | 11/2005 | Addink et al. | |
| 7,100,427 B2 | 9/2006 | Kahn et al. | |
| 7,330,796 B2 | 2/2008 | Addink et al. | |
| 7,360,413 B2 * | 4/2008 | Jeffries | G01M 3/2807 73/239 |

(Continued)

FOREIGN PATENT DOCUMENTS

| | | | |
|---|---|---|---|
| WO | WO-2006042053 A2 * | 4/2006 | E03C 1/242 |
| WO | WO-2016025919 A1 * | 2/2016 | G01M 3/2807 |

OTHER PUBLICATIONS

Pérez-Padillo, José, et al. "IoT platform for failure management in water transmission systems." Expert Systems with Applications 199 (2022): 116974. (Year: 2022).*

(Continued)

*Primary Examiner* — Luis A Brown

(74) *Attorney, Agent, or Firm* — PRICE HENEVELD LLP

(57) ABSTRACT

A water supply monitoring system in connection with a supply line includes sensors configured to detect supply properties, including a temperature, flow rate, and/or a pressure in the supply line. A controller receives the supply properties from the sensors and compares the supply properties to detection metrics. In response to a comparison of the supply properties relative to the detection metrics, the controller identifies an anomaly of a fluid supply or a consumption device. In response to the anomaly, the controller identifies a corrective action that may include a repair or installation of a conditioning device for the fluid supply and/or one of the consumption devices.

14 Claims, 11 Drawing Sheets

(56) References Cited

U.S. PATENT DOCUMENTS

| | | | | |
|---|---|---|---|---|
| 7,436,321 | B2 | 10/2008 | White, II et al. | |
| 7,669,461 | B2 | 3/2010 | Kates | |
| 7,711,454 | B2 | 5/2010 | Addink | |
| 8,347,427 | B2 | 1/2013 | Klicpera | |
| 8,887,324 | B2 | 11/2014 | Klicpera | |
| 8,893,320 | B2 | 11/2014 | Klicpera | |
| 9,061,307 | B2 | 6/2015 | Klicpera et al. | |
| 9,250,105 | B2 | 2/2016 | Patel et al. | |
| 9,254,499 | B2 | 2/2016 | Klicpera | |
| 9,266,136 | B2 | 2/2016 | Klicpera | |
| 9,297,150 | B2 | 3/2016 | Klicpera | |
| 9,324,228 | B2 | 4/2016 | Trout | |
| 9,494,480 | B2 | 11/2016 | Klicpera | |
| 9,749,792 | B2 | 8/2017 | Klicpera | |
| 9,928,724 | B2 | 3/2018 | Alcorn et al. | |
| 10,229,579 | B2 | 3/2019 | Alcorn et al. | |
| 10,317,306 | B2 * | 6/2019 | Saidi | G01M 3/2807 |
| 10,352,814 | B2 | 7/2019 | Enev et al. | |
| 10,378,940 | B2 | 8/2019 | Leaders et al. | |
| 10,410,501 | B2 | 9/2019 | Klicpera | |
| 10,489,038 | B2 | 11/2019 | Klicpera | |
| 10,526,771 | B1 * | 1/2020 | Devereaux | E03B 7/003 |
| 10,642,289 | B1 | 5/2020 | Reeder | |
| 10,671,502 | B1 | 6/2020 | Haslam et al. | |
| 10,837,160 | B2 | 11/2020 | Hammond et al. | |
| 11,047,496 | B1 * | 6/2021 | McConnell | E03B 7/071 |
| 11,530,531 | B2 * | 12/2022 | Poojary | E03B 7/072 |
| 2002/0010516 | A1 | 1/2002 | Addink et al. | |
| 2003/0070438 | A1 | 4/2003 | Kikuchi et al. | |
| 2004/0128034 | A1 | 7/2004 | Lenker et al. | |
| 2006/0137090 | A1 * | 6/2006 | Jeffries | G01M 3/2807<br>4/664 |
| 2006/0174707 | A1 | 8/2006 | Zhang | |
| 2008/0154755 | A1 * | 6/2008 | Lamb, III | G06Q 30/06<br>705/30 |
| 2009/0062978 | A1 * | 3/2009 | Picard | G06Q 30/0611<br>701/31.4 |
| 2009/0194719 | A1 | 8/2009 | Mulligan | |
| 2009/0308140 | A1 * | 12/2009 | Haseloh | G01M 3/2815<br>73/49.1 |
| 2011/0225721 | A1 * | 9/2011 | Miller | A61H 33/005<br>4/541.2 |
| 2011/0240144 | A1 * | 10/2011 | Jung | G05D 23/022<br>137/468 |
| 2012/0239211 | A1 * | 9/2012 | Walker | G05B 13/021<br>700/284 |
| 2016/0041565 | A1 | 2/2016 | Edwards | |
| 2016/0069048 | A1 | 3/2016 | Colbert et al. | |
| 2018/0275011 | A1 * | 9/2018 | Saidi | G01M 3/2807 |
| 2019/0234786 | A1 | 8/2019 | Klicpera | |
| 2019/0281371 | A1 | 9/2019 | Klicpera | |
| 2020/0133315 | A1 | 4/2020 | Rasmussen et al. | |
| 2020/0264067 | A1 | 8/2020 | Ance et al. | |
| 2020/0292408 | A1 | 9/2020 | Boston et al. | |
| 2020/0326216 | A1 | 10/2020 | Sarkissian et al. | |
| 2020/0393324 | A1 * | 12/2020 | Rudd | E03B 7/071 |
| 2021/0079630 | A1 * | 3/2021 | Poojary | G01F 1/66 |
| 2021/0278006 | A1 * | 9/2021 | McConnell | E03B 7/071 |
| 2021/0278092 | A1 * | 9/2021 | Revilla | G01N 33/18 |
| 2022/0049478 | A1 * | 2/2022 | Mason | E03B 7/071 |
| 2022/0051351 | A1 * | 2/2022 | Mason | G01F 1/662 |
| 2022/0215492 | A1 * | 7/2022 | McKenna, IV | G06N 20/00 |
| 2023/0281720 | A1 * | 9/2023 | Shao | G06Q 30/0206 |
| 2023/0341779 | A1 * | 10/2023 | Choi | F26B 15/02 |
| 2024/0077864 | A1 * | 3/2024 | Li | G01R 29/0892 |
| 2024/0319018 | A1 * | 9/2024 | Iizuka | G01K 5/68 |

OTHER PUBLICATIONS

Castle-Green, Teresa, et al. "Revisiting the digital plumber: Modifying the installation process of an established commercial IoT alarm system." Computer Supported Cooperative Work (CSCW) 32.3 (2023): 607-643. (Year: 2022).*

Jan, Farmanullah, et al. "IoT-based solutions to monitor water level, leakage, and motor control for smart water tanks." Water 14.3 (2022): 309. (Year: 2022).*

Ali, Ahmed S., et al. "A solution for water management and leakage detection problems using IoTs based approach." Internet of Things 18 (2022): 100504. (Year: 2022).*

Whittle, Andrew J., et al. "Sensor networks for monitoring and control of water distribution systems." (2013). (Year: 2013).*

Islam, Mohammed Rezwanul, et al. "An intelligent IoT and ML-based water leakage detection system." IEEE Access 11 (2023): 123625-123649. (Year: 2023).*

Froehlich, Jon E., et al. "HydroSense: infrastructure-mediated single-point sensing of whole-home water activity." Proceedings of the 11th international conference on Ubiquitous computing. 2009. (Year: 2009).*

Kumar, Kuganesan, and Moamin A. Mahmoud. "Monitoring and controlling tap water flow at homes using Android mobile application." American Journal of Software Engineering and Applications 6.6 (2017): 128-136. (Year: 2017).*

* cited by examiner

254

| Inputs for Detection | | | | | Condition Detected | Corrective Action | Improvement/Savings |
|---|---|---|---|---|---|---|---|
| Temp. | Pressure | Flow Rate | Valve Hardware | Coms | | | |
| | Variations (e.g., peaks) | | | | Pressure variations (high) exceeding specified plumbing code detected in supply | Install pressure regulator (if pressure is consistenly too high). | Reducing or controlling pressure prevents damage and premature failure to pipes, valves, fittings, fixtures and water appliances |
| | Decreases in supply pressure | | | | Pressure variations (low) detected in supply | Install a booster pump (if pressure is consistenly too low). | Increase comfort from variations/provides sufficient pressure to improve appliances operation |
| Temp. < 2˚C | | | | | Incoming water temperature below freeze warning limit | Insulate pipe and/or heat surrounding area. | Mitigate risk of frozen pipes rupturing and resulting potential water damage |
| Temp. > 18˚C | | | | | Contamination (e.g., bacteria) warning | Disinfect/treat incoming water and/or lower temperature | Chemical disinfection apparatus, secondary cold water source, thermostatic mixing valve |
| | | Detect device and flow | | | Excess water consumption (flow or usage) correlated to specific device or device type | Repair or replace assocated fixture or appliance (e.g. toilet, shower head, etc.). | Decrease water use by approximately XX gal. per year. Cost savings $XX per year. |
| | | Excess flow of total system | | | Excess total water consumption (total system usage over period) | Set household conservation goals. Set alerts to notify usage trends related to goals. | Decrease water use by approximately XX gal. per year. Cost savings $XX per year. |
| | | | Valve test - Open/close valvle | | Valve open or close failure | Repair or replace Hydro-Shield Valve. | Proactive repair or replacement of Hydro-Shield device to ensure system protection. |
| | | | | Connection Failure | Communication failure with device network | Verify network hardware and connection strength | Replacement network hardware, relocate wireless transceiver, address the issue with the service provider, etc. |

FIG. 7

PLUMBING MONITORING SYSTEM WITH PROGRESSIVE MAINTENANCE AND ENHANCEMENT ASSISTANCE

TECHNOLOGICAL FIELD

The disclosure relates to a fluid supply monitoring system and, more particularly, to a monitoring system configured to detect and assist in the correction of plumbing defects.

BACKGROUND

The present disclosure generally relates to a fluid supply monitoring and isolation device. The fluid monitoring aspects of the disclosure provide valuable information that may assist in diagnosing plumbing defects. As further discussed in the detailed description, the system may provide for a variety of features to support maintenance and/or improvements of a fluid supply or pluming system.

SUMMARY

In one aspect, a water supply monitoring system is disclosed that includes a plurality of sensors in connection with a water supply line. The sensors may be configured to detect various supply properties comprising at least one of a temperature, flow rate, and a pressure in the supply line. The supply monitoring system further includes a controller that receives the supply properties from the sensors and compares the supply properties to a plurality of detection metrics. In response to a comparison of the supply properties to the detection metrics, the controller may identify an anomaly of a water supply communicated through the water supply line or at least one consumption device in communication with the supply line. In response to the identification of the anomaly, the controller may identify a corrective action. In various cases, corrective actions may include a repair of at least one consumption device, a replacement of the at least one consumption device, an insulation or replacement of a conditioning device, and/or a treatment of the fluid supply communicated through the supply line.

In another implementation, a method for identifying a corrective action for a water supply line of a water supply system is disclosed. The method may include receiving a request for a diagnostic evaluation of a feature of the water supply system and receiving at least one fluid supply value of a fluid supply provided by the water supply line from a plurality of sensors. The one or more fluid supply values may then be compared to a plurality of detection methods related to the operation of the feature of the water supply system. Based on the comparison, the method may detect one or more flow anomalies of the water supply system.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 7 is a table demonstrating a plurality of inputs and corresponding conditions and corrective actions that may be identified and communicated or enacted by the monitoring and control system.

DETAILED DESCRIPTION OF EMBODIMENTS

Figure 1:
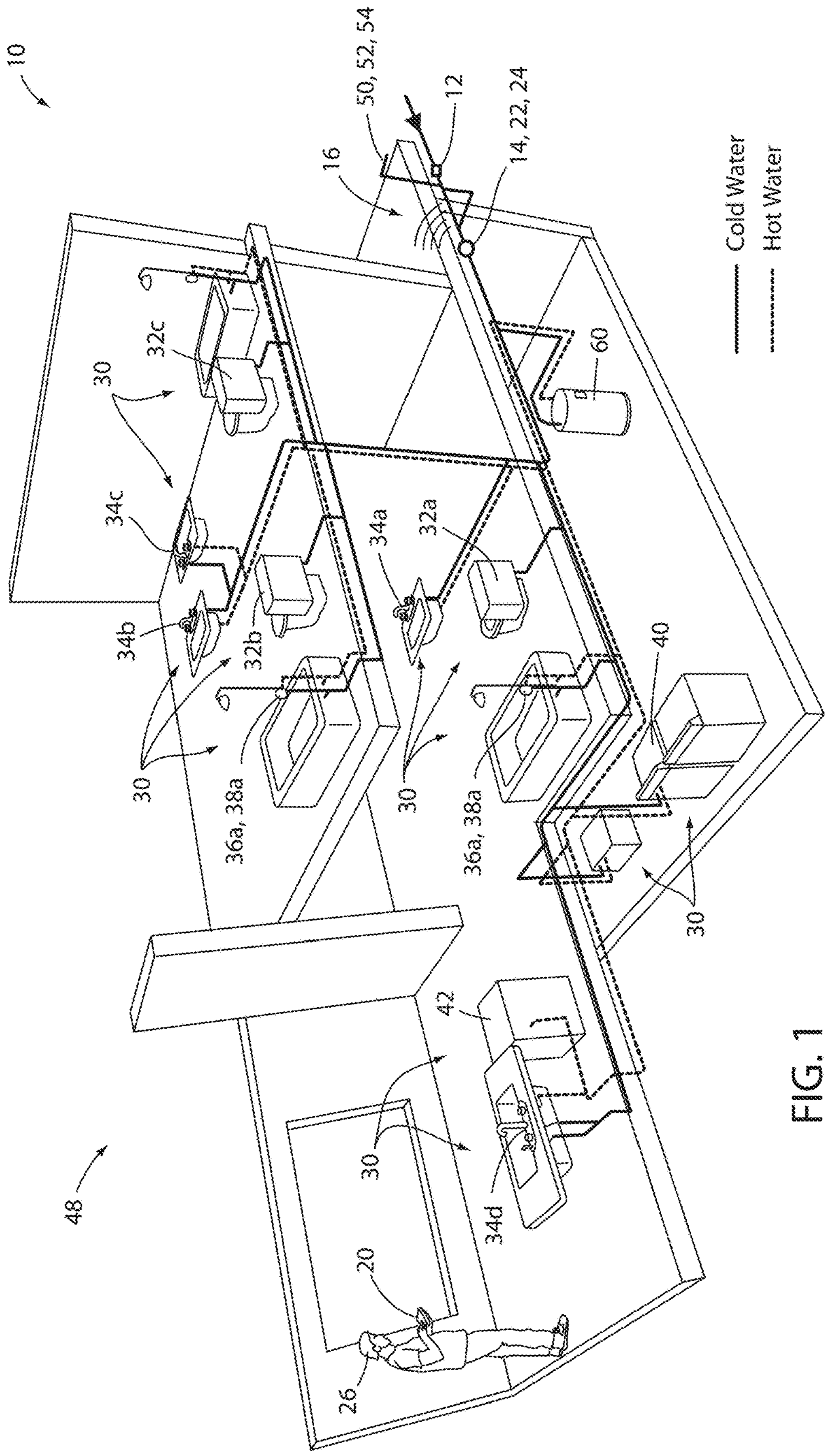
FIG. 1 is a projected view of a water supply system including a monitoring system.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Referring generally to FIGS. 1-8, the disclosure provides for a monitoring and control system 10 configured to detect various attributes of a fluid delivered through a supply line 12 and control the passage of the fluid based on the detected attributes, as well as one or more manual or remote inputs. As demonstrated in FIGS. 1-3, the monitoring system 10 may comprise a monitoring apparatus 14 in connection with the supply line 12. In various implementations, the monitoring apparatus 14 may be configured to wirelessly communicate via a device network 16, which may be facilitated by a local device hub 18. As later discussed in reference to FIG. 8, the local device hub 18 may correspond to a wireless router, which may be in communication with a plurality of electronic devices (e.g., smart devices), and may also be in communication with a mobile device 20 and/or a remote server providing remote access and communication with the monitoring apparatus 14. Accordingly, the system 10 may provide for remote monitoring and control of the supply line 12 via the mobile device 20.

In some instances, the monitoring system 10 may detect the attributes of the fluid in the supply line 12 to identify a warning state or an excessive flow condition. The attributes of the fluid may be monitored via a plurality of sensors 22 (e.g., pressure sensor 22*a*, a fluid sensor 22*b*, temperatures sensor 22*c*, contaminant or quality sensors 22*d*, etc.) incorporated in the monitoring apparatus 14 and in connection with the supply line 12. In this configuration the excess flow or warning state may be identified as a fluid leak supplied from the supply line 12. In response to the excess flow condition, a controller of the monitoring apparatus 14 may be configured to control the flow of the fluid through the supply line 12 by actuating a valve 24. The attributes of the fluid delivered by the apparatus 14 may include a flow rate, a fluid pressure, a temperature, and other attributes of the fluid. Further detailed discussion regarding the controller of the monitoring apparatus 14, the device network 16, and various aspects of the system 10 are discussed in reference to FIG. 8.

The system 10 may be configured to identify whether a potential fluid leak associated with the supply line 12 is an actual fluid leak based on sensor data communicated by the sensors 22. By inferring information from the combined operation of the sensors 22, the controller of the system 10 may be operable to identify that a potential leak is actually related to a sensor failure rather than a leak condition. In addition to distinguishing an actual leak from a potential leak, the controller of the system 10 may also be configured to identify and distinguish failures related to the operation of a pressure sensor 22*a*, a fluid sensor 22*b*, and/or a failure of the valve 24. In some cases, the sensors 22 may further include one or more water contaminant or quality sensors 22*d*. For example, the quality sensor(s) 22*d* may include a pH sensor, conductivity sensor, residual chlorine sensor, turbidity sensor, ion probe sensor, etc. Accordingly, the system 10 may be configured to identify a variety of conditions of the fluid as well as the operation of the monitoring apparatus 14 by making intelligent inferences based on the data communicated from the sensors 22. Such operation not only allows a user 26 to remotely monitor and control the system 10 via the mobile device 20 but also ensures that the information reported to the user 26 does not result in false alarms that may otherwise significantly limit the trustworthiness and corresponding benefit of the information provided by the system 10.

In addition to identifying potential fluid leaks and monitoring the operating status of the monitoring apparatus 14, the system 10 may further be configured to identify instances of fluid flow of the fluid communicated via the supply line 12 and classify the water or fluid consumed as being attributed to various consumption implements 30 supplied with fluid via the supply line 12. As demonstrated in FIG. 1, the consumption implements 30 may include, but are not limited to, a toilet 32, a faucet 34, a shower 36, a bathtub 38, and a plurality of appliances. The appliances may include a clothes washer 40, a dishwasher 42, a humidifier 44, and various other appliances that may receive fluid from the supply line 12. In some cases, the system 10 may additionally be configured to monitor fluid supplied via the supply line 12 to consumption implements that may be outside a building 48 or dwelling. For example, the system 10 may also be configured to identify fluid supplied to an exterior spigot 50, an irrigation system 52, a pool or hot tub supply 54, or various other consumption implements 30.

In order to identify the portions of the fluid consumed and/or delivered to the various consumption implements 30, the system 10 may compare the flow rate of the fluid identified by the fluid sensor 22*b* to various consumption or flow rate models. In this way, the system identifies flow data that is characteristic or identifiable as corresponding to behavior that can be associated or attributed to one or more specific consumption implements 30 and/or classifications of fluid consumption as further discussed herein. In various examples, the system 10 may provide for detailed monitoring of the fluid supplied via the supply line 12, detailed analysis of classes or specific consumption implements 30 responsible for the consumption, and comparative analysis information that may identify variations and/or inefficiencies in the use of the water or fluid delivered via the supply line 12.

In some implementations, the system 10 may initially classify the fluid consumption in general use categories that may correspond to preconfigured or preloaded flow rate or consumption models. Such preconfigured consumption models may generally outline ranges of characteristic flow data over time that represents the characteristic flow rate associated with each of the consumption implements 30. For example, the system 10 may begin by categorizing the consumption of each of the toilets 32 in a combined consumption group. However, by monitoring and recording the characteristic behavior of each of a first toilet 32*a*, a second toilet 32*b*, and a third toilet 32*c*, the controller of the system 10 may detect and learn identifiable characteristics of the flow data associated with each of the individual toilets 32, such that the operation of each of the toilets 32 may be distinguished and separately classified. Similarly, the controller of the system 10 may be operable to distinguish the characteristic flow rate of a first bathtub 38*a* from a second bathtub 38*b* and, in some cases, may be operable to distinguish the characteristic flow rates of each of a first faucet 34*a*, a second faucet 34*b*, a third faucet 34*c*, and/or a fourth faucet 34*d*. Though in some cases the flow rate associated with one or more of the toilets 32 or faucets 34 may not be readily distinguishable based solely on the flow rates identified by the fluid sensor 22*b*, the system 10 may distinguish and classify the consumption associated with a variety of the consumption implements 30 by generating implement specific consumption models that may be applied to categorize the fluid use among each of the consumption implements 30. In this way, the system 10 may identify and record the use or fluid flow instances associated with specific implements (e.g., the first toilet 32*a*) in connection with the supply line 12.

Figure 2:
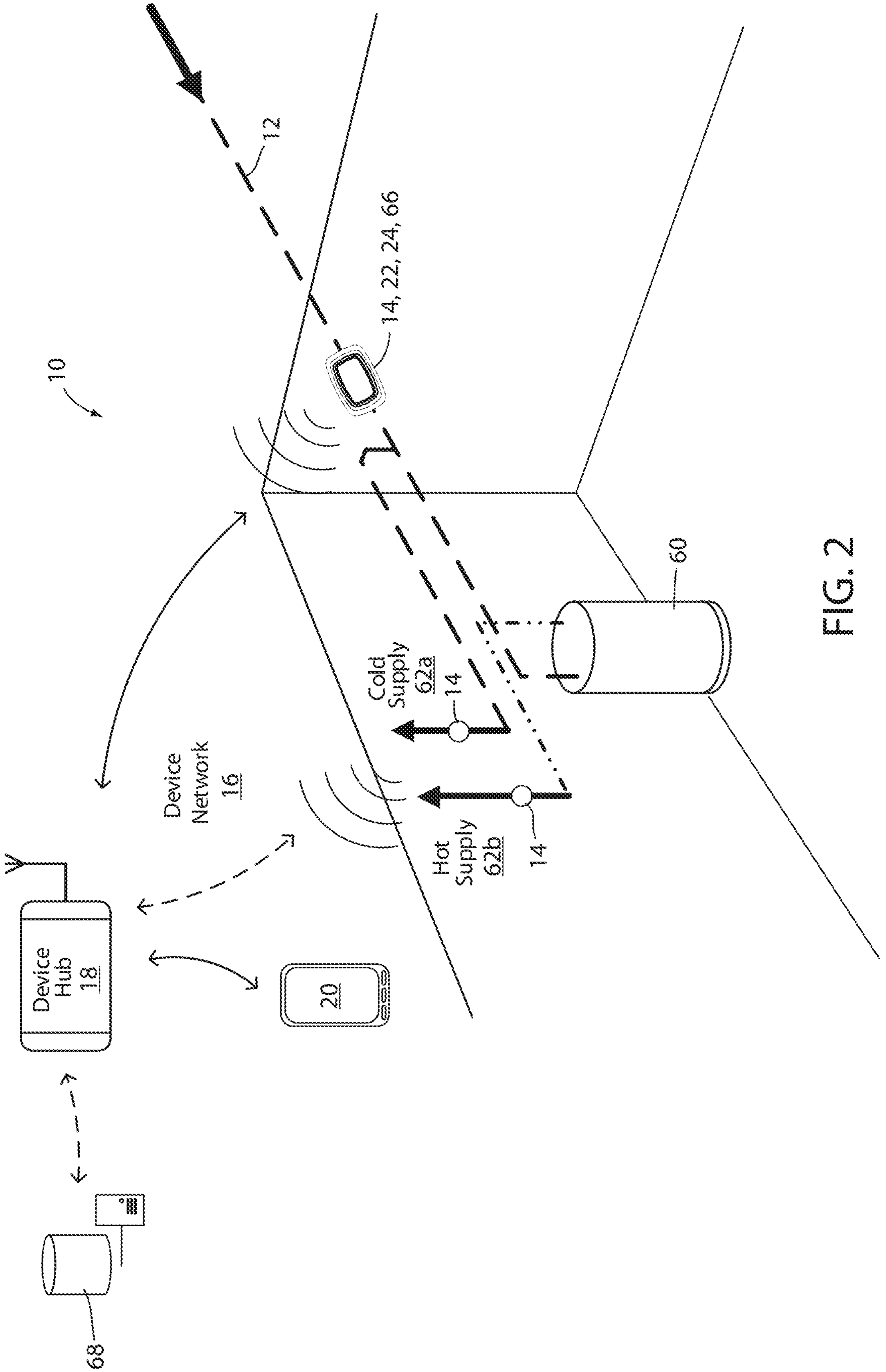
FIG. 2 is a simplified projected view of a monitoring system demonstrating a control apparatus in wireless communication with a device network.

Referring now to FIG. 2, a simplified diagram demonstrating the monitoring apparatus 14 is shown in connection with the supply line 12. In a typical installation, the monitoring apparatus 14 may be installed in-line with the supply line 12 inside or outside the building 48. In a conventional installation, the monitoring apparatus 14 may supply water or fluid to a water heater 60 in connection with one or more of the consumption implements 30. In such cases, a cold water supply 62*a* and a hot water supply 62*b* may be supplied with fluid through the monitoring apparatus 14 via the supply line 12. In some cases, a plurality of the monitoring apparatuses 14 may be separately connected to monitor the cold water supply 62*a* separate from the hot water supply 62*b*. Each of the monitoring apparatuses 14 may communicate the flow rate information captured via the fluid sensor 22*b*, as well as the additional sensor data, to a central controller 66 or remote server 68. In this configuration, the combined information may further be analyzed to classify the hot and cold water consumed by the various consumption implements 30 and provide further characteristic information that may be compared to the flow rate or consumption models, as well as tune the implement specific consumption profiles for each of the consumption implements 30. Additionally, as depicted in reference to FIG. 1, additional monitoring apparatuses 14 or application sensors may be connected with supply lines delivering fluid to specific consumption implements 30 or groups of the consumption implements 30. Accordingly, the system 10 may include one or more of the monitoring apparatuses 14 to provide a scalable solution to provide further detailed analysis and/or be implemented in large scale operating environments.

Figure 3B:
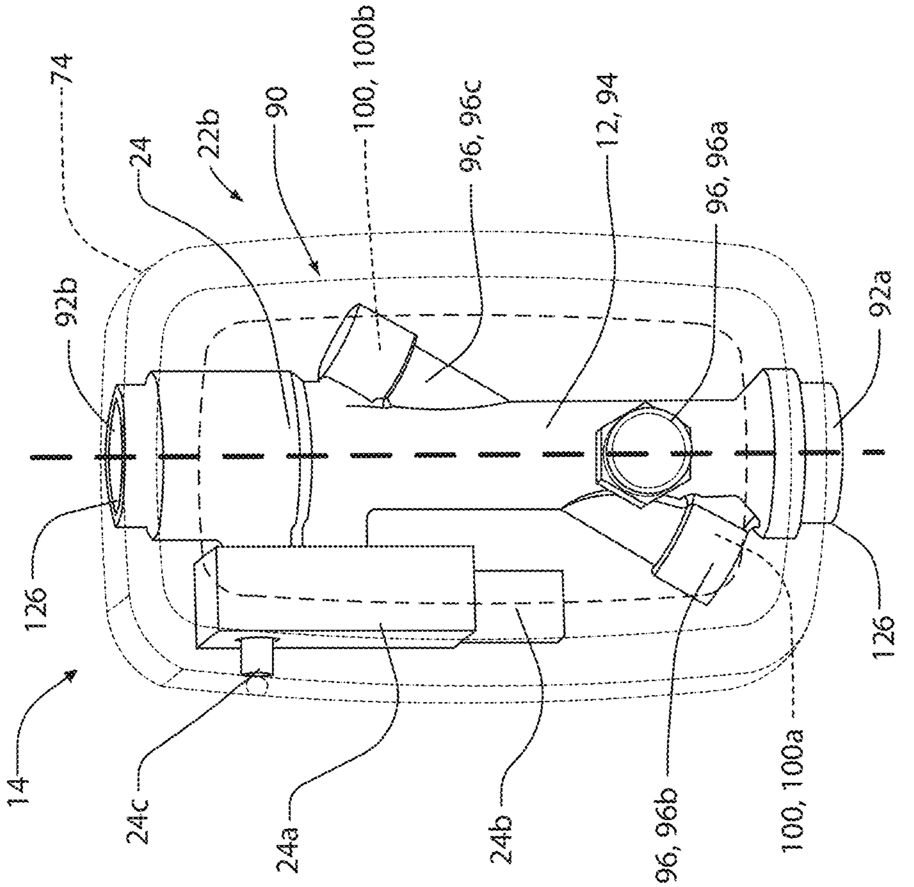
FIG. 3B is a partially transparent view of a monitoring and control apparatus as shown in FIG. 3A, demonstrating a control valve and sensors in connection with a supply line.
Figure 3A:
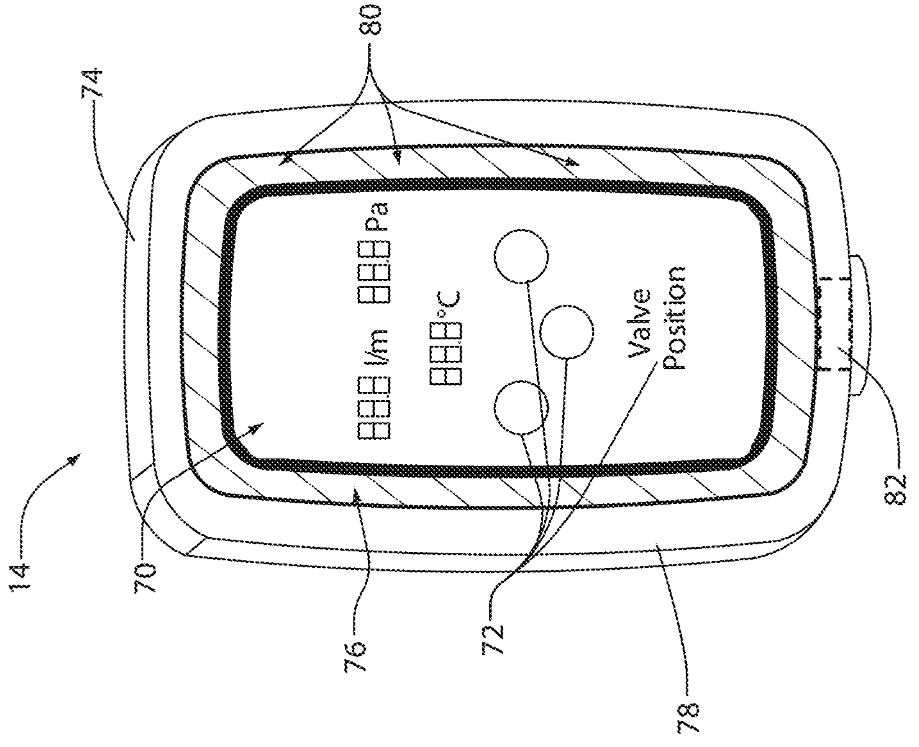
FIG. 3A is a projected view of a monitoring and control apparatus.

Referring now to FIGS. 3A, 3B, 4A, 4B, and 4C, an exemplary embodiment of the monitoring apparatus 14 is shown in various views and levels of detail. As demonstrated in FIG. 3A, the monitoring apparatus 14 includes an indictor display 70 that displays the pressure detected by the pressure sensor 22*a*, the flow rate identified by the fluid sensor 22*b*, and a temperature identified by a temperature sensor 22*c*. Accordingly, the indicator display 70 may comprise one or more alpha/numeric LCDs (e.g., liquid crystal displays), as well as one or more indicators 72 configured to illuminate and identify the operating status of the monitoring apparatus 14. For example, the indicators 72 may be selectively illuminated by the controller of the monitoring apparatus 14 to identify a freeze warning, a connection status to the device network 16, and an operating status of the system 10 and/or the supply line 12. As shown in FIG. 3A, the indicators 72 also include a valve position indicator configured to identify whether the valve 24 is in an open position or a closed position. Accordingly, the indicator display 70 and the indicators 72 may be incorporated on a housing 74 of the monitoring apparatus 14, such that the status of the apparatus 14 and, more generally, the system 10 may be readily identifiable based on the visible representations on the indicator display 70.

In some implementations, a recessed trough 76 may be formed by the housing 74 about a perimeter of the indicator display 70. The recessed trough 76 may extend to a perimeter bezel 78, which may extend about an outer perimeter of a front face of the housing 74. Within the recessed trough 76, the monitoring apparatus 14 may further include a status indicator 80. The status indicator 80 may extend along the recessed trough 76 proximate to the indicator display 70, such that illumination emitted from the status indicator 80 may evenly illuminate the recessed trough 76 about the entirety of the indicator display 70. The status indictor 80 may correspond to one or more multi-colored light emitters (e.g., red-green-blue [RGB] light emitting diodes) configured to illuminate the recessed trough 76 in a plurality of colors of light. In order to provide for consistent illumination of the recessed trough 76, the status indicator may include a diffusing layer or light guide configured to blend light from individual emitters and create a halo effect.

In operation, the controller of the monitoring apparatus 14 may control the status indicator 80 to illuminate the recessed trough 76 in a green color identifying a fully operational status, a yellow color identifying a warning status, and/or a red color representing a failure or leak status attributed to the operation of the system 10 and/or the apparatus 14. In some cases, a communication port 82 may also be accessible via an opening or door formed in the perimeter bezel 78. The communication port 82 may be provided to support local diagnostic communication with the monitoring apparatus 14 and may be implemented via a variety of communication standards (e.g., serial communication, parallel communication, Ethernet, etc.). In addition to the visible indicators 72, the monitoring apparatus 14 may also include one or more speakers and/or buzzers configured to emit audible indications identifying the operation of the monitoring apparatus 14.

As demonstrated in FIG. 3A, a number of properties detected by the sensors 22 of the monitoring apparatus 14 may be demonstrated on the indicator display 70. The properties may correspond to flow parameters (e.g., pressure, flow rate, accumulated flow, pressure/flow variations, etc.), water quality metrics (e.g., temperature, turbidity, pH, etc.), or various properties related to the operation of the consumption implements 30. The properties may be demonstrated with corresponding units of measure that may correspond to a geographic region of the supply line 12 or adjusted by one or more settings in a user-interface menu. Accordingly, though sample measurements are shown in the International System of Units (SI), the system 10 may be configured to demonstrate data using Customary units or the English system of measurement. Accordingly, the system 10 may be flexibly implemented based on a geographic region of operation and/or a preference of the user 26.

As shown in FIG. 3B, the housing 74 is depicted in hidden lines demonstrating a relationship between a valve and sensor assembly 90 of the monitoring apparatus 14 in relation to the body of the housing 74. In later examples, an additional exemplary valve and sensor assembly 102 may be described in reference to specific features that may be similarly implemented in various implementations of the monitoring apparatus 14. As shown in FIG. 3B, the assembly 90 is largely enclosed within the housing 74, such that the sensor and valve assembly 90 is protected and not readily visible when viewing the indicator display 70. In order to connect to the supply line 12, the monitoring apparatus 14 comprises connection fittings 92 between which a central line 94 extends. Accordingly, the assembly 90 is configured to connect in-line with the supply line 12. In this configuration, the monitoring apparatus 14 may be implemented without occupying significant space and without interrupting the flow from the supply line.

As previously discussed, the valve 24 is configured to selectively open and close the flow path of the fluid through the central line 94 in the event of a leak condition, a testing operation, and/or based on a user setting. The controller may control a valve actuator 24*a* by supplying a control signal to a solenoid 24*b*. In addition to the solenoid 24*b*, the valve 24 may further include a manual actuator 24*c*, which may be accessible via an opening formed in a side portion of the housing 74. In an exemplary embodiment, the valve 24 may correspond to a quarter-turn ball valve, such that the valve may be rapidly opened or closed in response to a leak detection. In some examples, the valve 24 may similarly be implemented as a compression valve or any suitable device that may control or selectively suppress a flow of the fluid through the central line 94.

In addition to the valve 24, a plurality of ports 96, may be in connection with the central line 94. A first port 96*a* may be formed approximately perpendicular to the central line 94 and may provide for a sealed connection of the pressure sensor 22*a* and/or the temperature sensor 22*c* with the fluid environment contained with the central line 94. Additionally, a second port 96*b* and a third port 96*c* may extend from the central line 94 at acute angles on opposing sides of the central line 94. The second port 96*b* and the third port 96*c* may each be configured to sealably house an ultrasonic sensor 100. In this configuration, the ultrasonic sensors 100 are aligned on opposite sides of a fluid flow through the central line 94 to form the fluid sensor 22*b*. Accordingly, each of the ports 96 formed in the sensor and valve assembly 90 may provide access for the sensors 22 to monitor the attributes of the fluid flowing through the central line 94 and thereby enable the controller of the monitoring apparatus 14 to receive sensor data from the sensors 22.

Figure 4A:
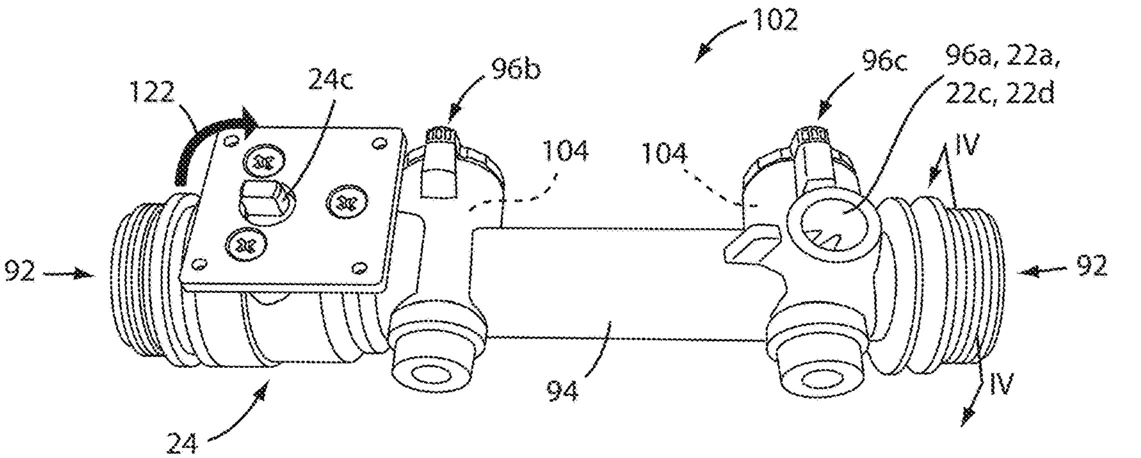
FIG. 4A is a projected partial assembly view of a monitoring and control apparatus.
Figure 4B:
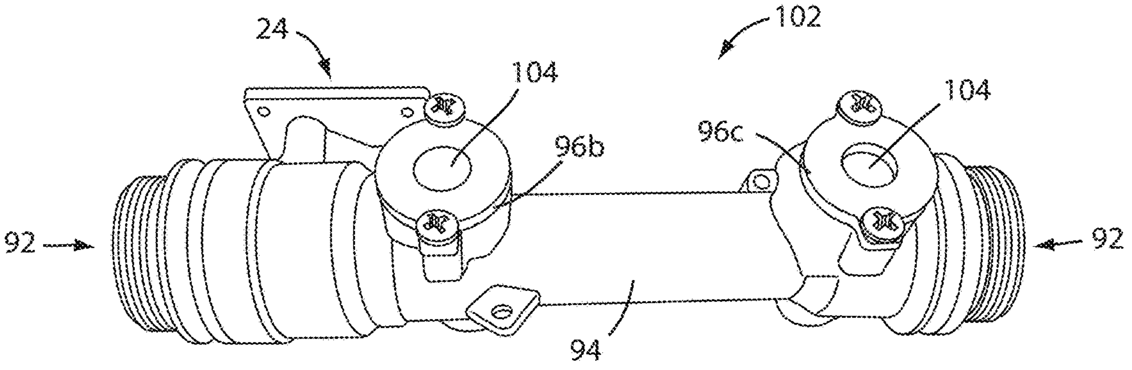
FIG. 4B is a projected partial assembly view of a monitoring and control apparatus.
Figure 4C:
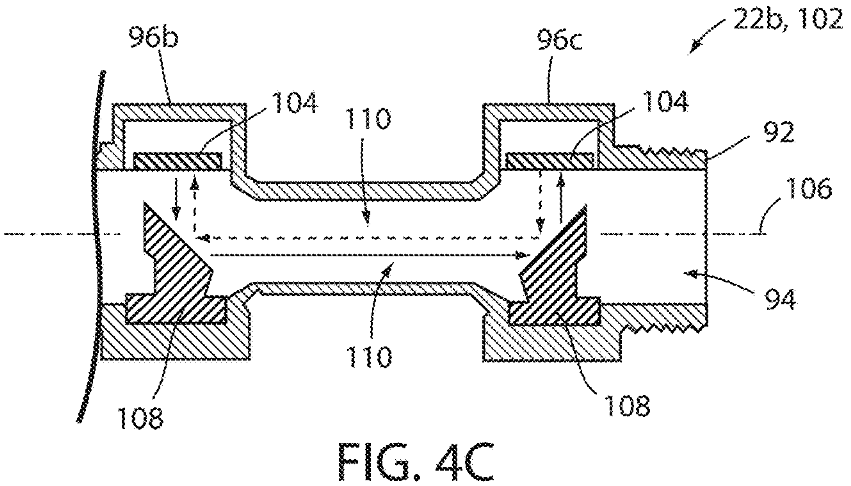
FIG. 4C is a cross-sectional view of a monitoring and control apparatus sectioned along line IV-IV demonstrated in FIG. 4A.

Still referring to FIGS. 3-4, further details of the sensor and valve assembly 90 are discussed demonstrating exemplary features and components. In the example shown in FIG. 38, the ultrasonic sensors 100 forming the fluid sensor 22*b* may each correspond to transmitter receivers (i.e., transceivers) located on opposing sides of the central line 94. In this configuration, the fluid sensor 22*b* may be configured to detect the flow rate of the fluid through the central line 94 based on a time-of-flight principle. As shown in FIGS. 4A-4C, the ultrasonic sensors 104 forming a fluid sensor 22*b* may be positioned on one side of the central line 94. The ultrasonic sensors 104 may be configured to detect the flow rate of the fluid through the central line 94 based on a Doppler-effect principle. Similar to the ultrasonic sensors 100, the ultrasonic sensors 104 may each correspond to transmitter receivers (i.e., transceivers) located along a flow path 106 of the fluid provided through the central line 94. In each of the examples, the monitoring system 10 may calculate the average fluid velocity of the fluid traveling through the central line 94 and the corresponding flow rate of the fluid passing through the supply line 12. The fluid sensor 22*b* may be operable to detect the flow rate of the fluid at a rate as low as approximately 0.001 liters (L)/minute or 0.005 GPM. Accordingly, the fluid sensor 22*b* may be flexibly implemented to achieve a desired level of accuracy and economy based on the desired parameters of the monitoring system 10, Further detailed discussion regarding the controller of the monitoring apparatus 14, the device network 16, and various aspects of the system 10 are further discussed in reference to FIG. 8.

Referring now to FIGS. 4A-4C, the sensor and valve assembly 102 is shown and described in further detail. The valve assembly 102 may provide for similar operating functions and characteristics to the sensor and valve assembly 90. Accordingly, like reference numerals and terms are utilized in reference to FIGS. 4A-4C to discuss similar operational elements. The primary difference between the valve assembly 90 and the valve assembly 102 is that the fluid sensor 22*b* is provided in an alternate configuration. As shown, the ultrasonic sensors 104 may be arranged perpendicular to the flow path 106 and reflect approximately 90° via a plurality of reflectors 108. In this configuration, the central line 94 extending between the ultrasonic sensors 104 and the reflectors 108 may provide for a sensor pipe through which ultrasonic waves pass along a transmission path 110 with the flow of the fluid and against the flow of the fluid between the ultrasonic sensors 104 to detect the flow rate of the fluid traveling through the central line 94. As shown, the reflectors 108 may extend into the flow path 106 of the fluid in the central line 94, which may result is some turbulence in the flow of fluid through the central line 94 and may also provide for the transmission path 110 of the ultrasonic waves to travel in direct opposition to and directly along the fluid flow as denoted by the fluid path 110. In this configuration, the ultrasonic sensors 104 may provide for the fluid sensor 22*b* to detect and monitor the flow rate through the sensor and valve assembly 102 with improved accuracy. Accordingly, the fluid sensor 22*b* with the configuration of the ultrasonic sensors 104 depicted in FIGS. 4A, 4B, and 4C may provide for the detection of flow rates with an accuracy of approximately or less than 0.001 liters (L)/minute or 0.005 GPM.

As demonstrated, the sensor and valve assembly 102 may incorporate each of the pressure sensor 22*a* and the temperature sensor 22*c* via the first port 96*a* connected perpendicular to the central line 94. The valve 24 is configured to control the passage of the fluid through the central line 94 and may be configured to provide a full-bore cross-section from the central line 94 when arranged in the open position (shown in FIG. 6). As previously discussed, the valve 24 may be implemented as a ball valve in connection with the valve actuator 24*a*. In this configuration, a control signal from the controller of the monitoring apparatus 14 is communicated to the solenoid 24*b* to control the valve actuator 24*a* to rotate the hollow pivoting ball 24*d* between an open position and a closed position with only a quarter-turn of rotation, as depicted by arrow 122. Additionally, the valve 24 includes a manual actuator 24*c* that may similarly rotate the valve actuator 24*a* to control the flow rate by adjusting the orientation of the hollow pivoting ball 24*d*.

In general, the system 10 may be configured to store and process the flow rate data communicated from the fluid sensor 22*b* and compare the flow rate data to preloaded flow rate or consumption models in order to identify and classify the fluid consumption as being associated with one or more classifications of the consumption implements 30. As previously discussed, the monitoring apparatus 14 and, more generally, the monitoring system 10 may be configured to classify the fluid consumption of the fluid passing through the supply line 12 and attribute the consumption to various consumption implements 30 including, but not limited to, toilets 32, faucets 34, showers 36, bathtubs 38, clothes washers 40, dishwashers 42, humidifiers 44, spigots 50, irrigations systems, 52, and/or pool or hot tub supplies 54. Examples of flow rate models and corresponding methods of detecting the operation of consumption implements similar to those discussed herein may be found in U.S. Patent Publication No. 2022/0051351A1, the disclosure of which is incorporated herein by reference in its entirety.

Figure 5A:
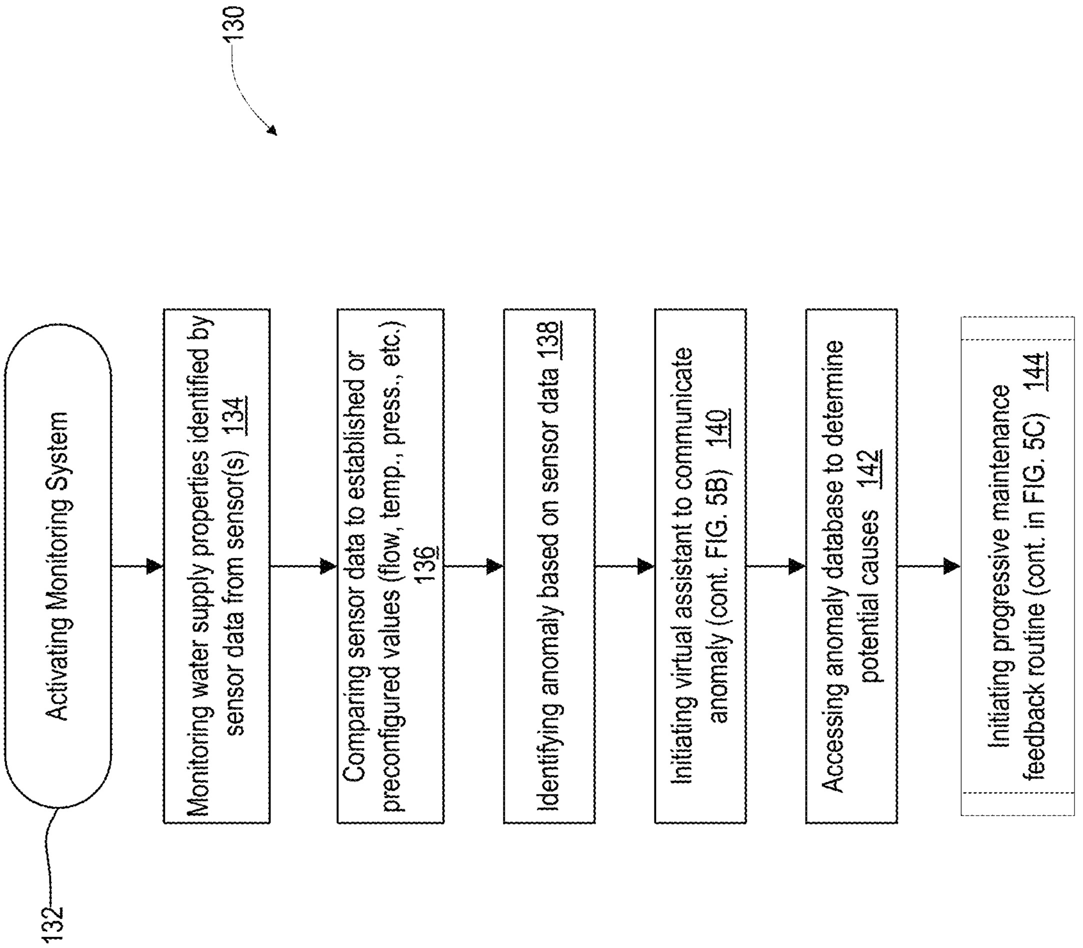
FIG. 5A is a flow chart demonstrating a method of operation of a monitoring and control system for a water supply line.
Figure 5B:
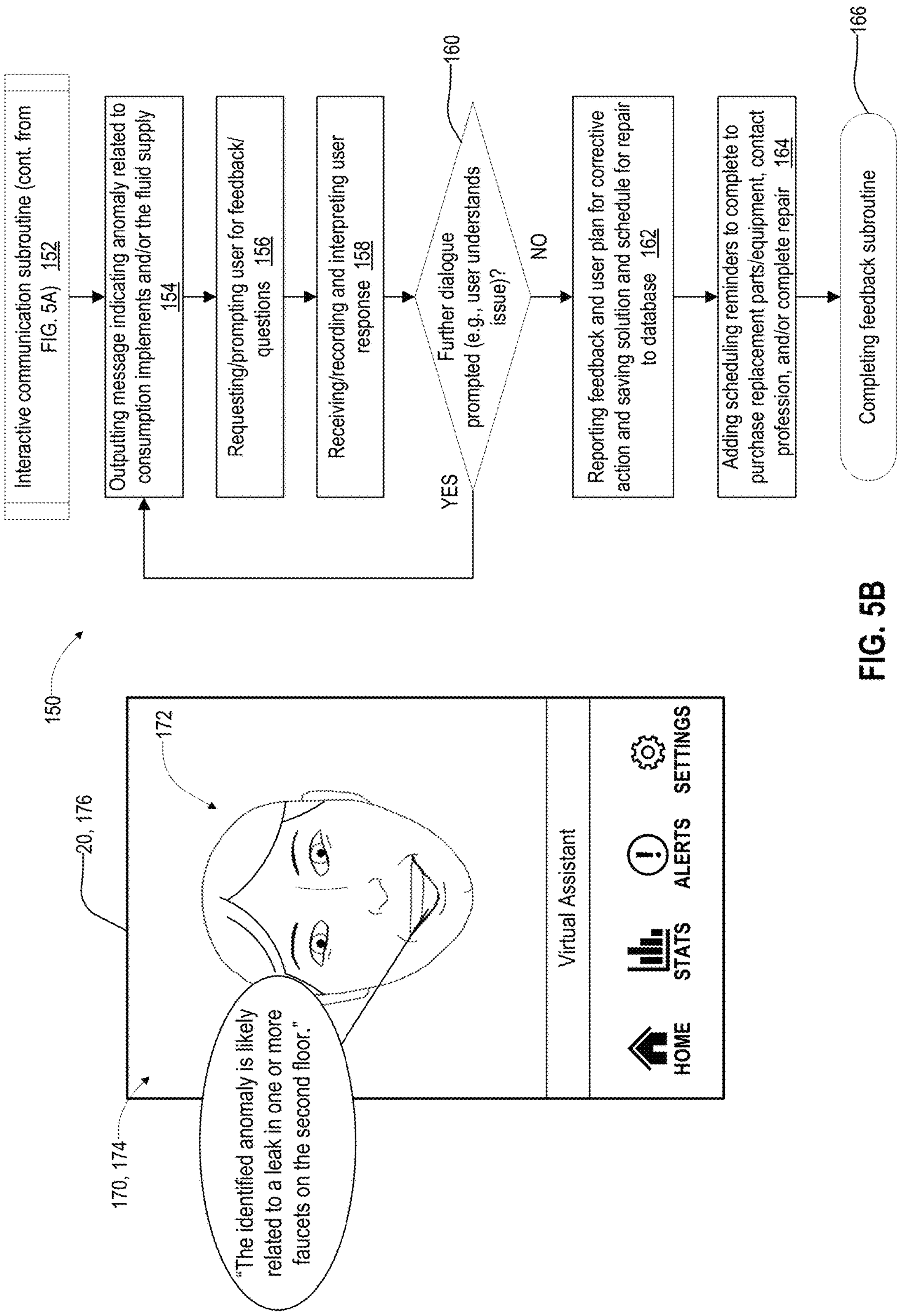
FIG. 5B is a flow chart demonstrating a continuing method from FIG. 5A demonstrating an interactive communication subroutine.
Figure 5C:
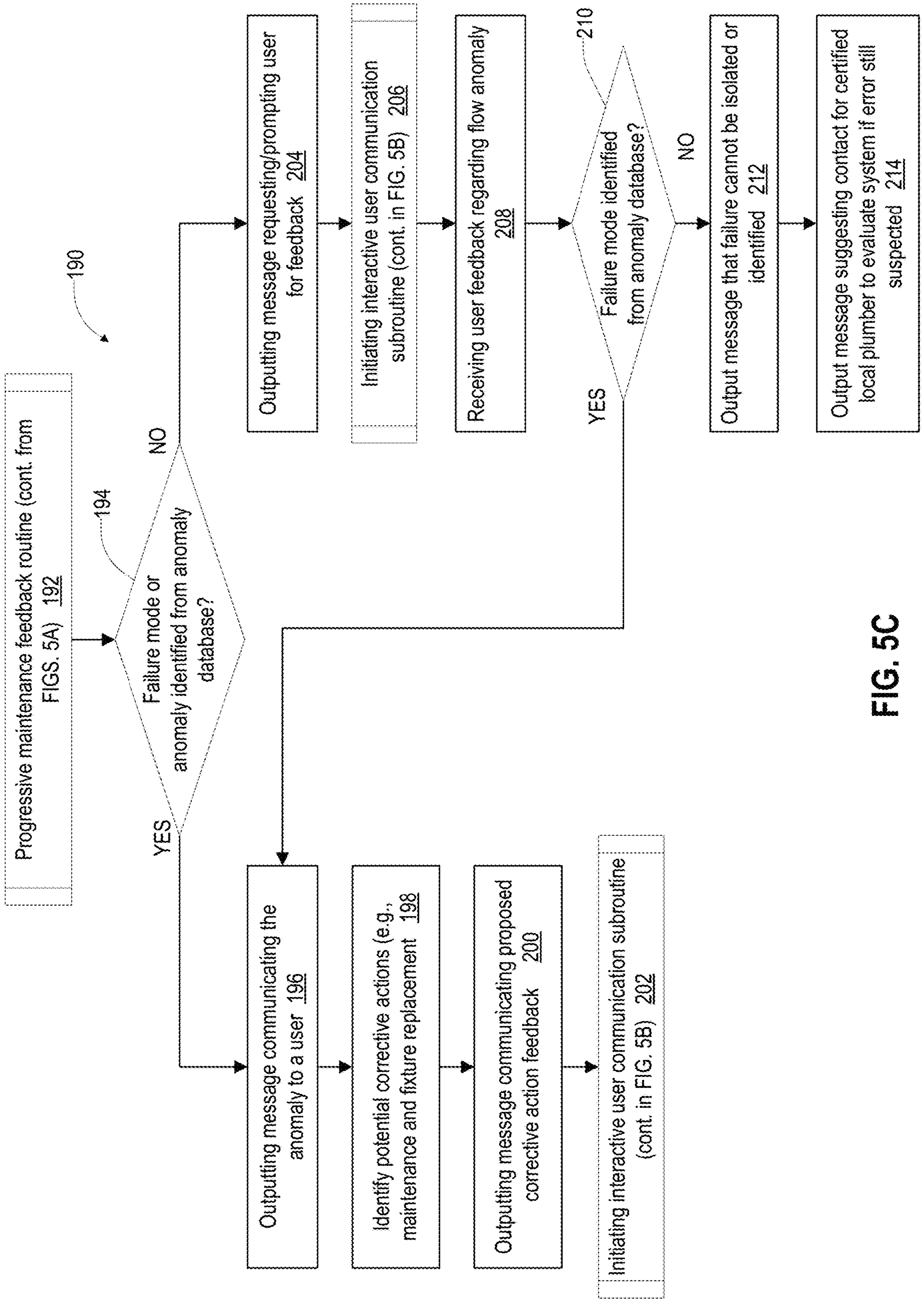
FIG. 5C is a flow chart demonstrating a continuing method from FIG. 5A that provides for a maintenance feedback routine.
Figure 5D:
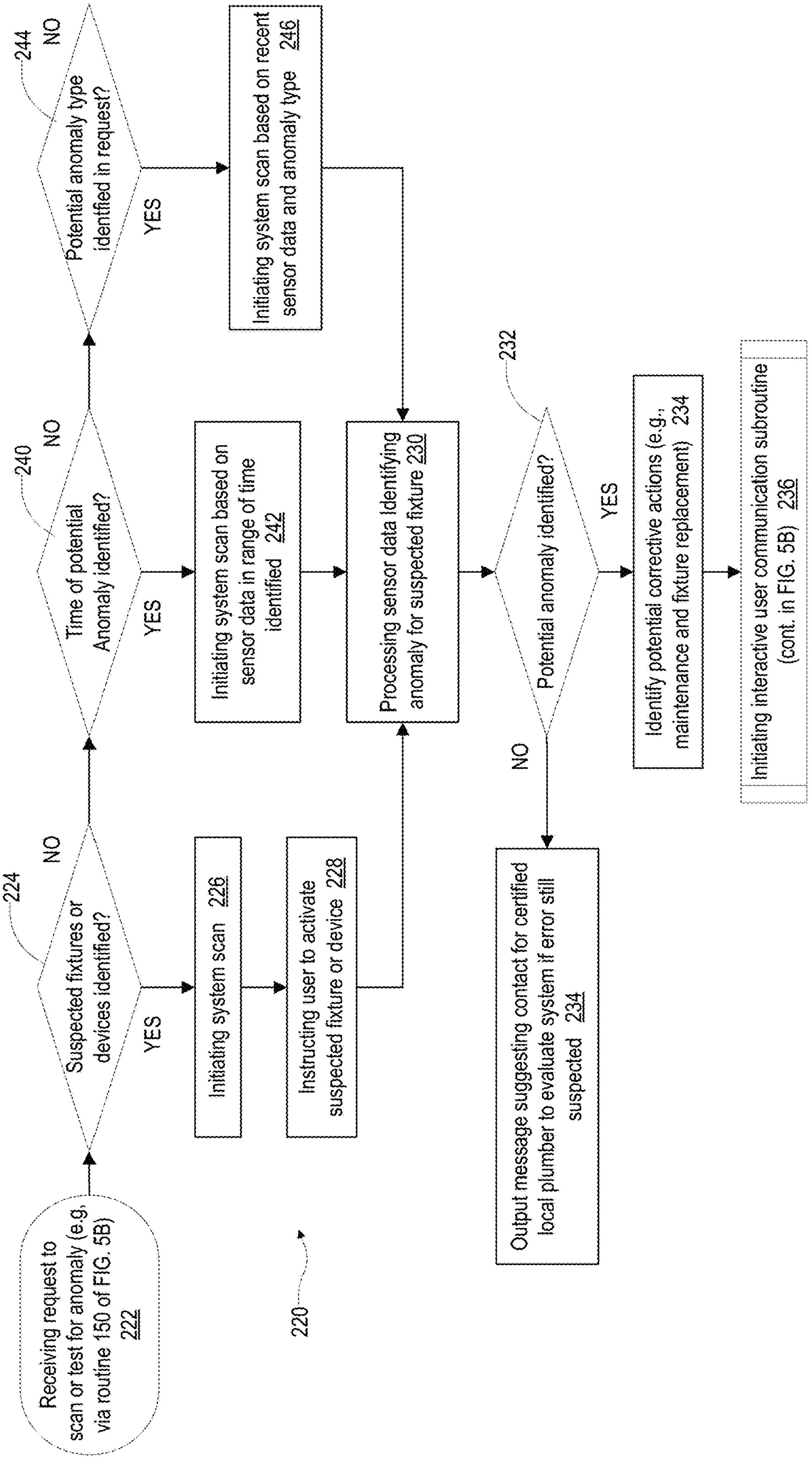
FIG. 5D is a flow chart demonstrating a continuing method form FIG. 5A demonstrating a user initiated procedure for a flow anomaly detection.
Figure 6:
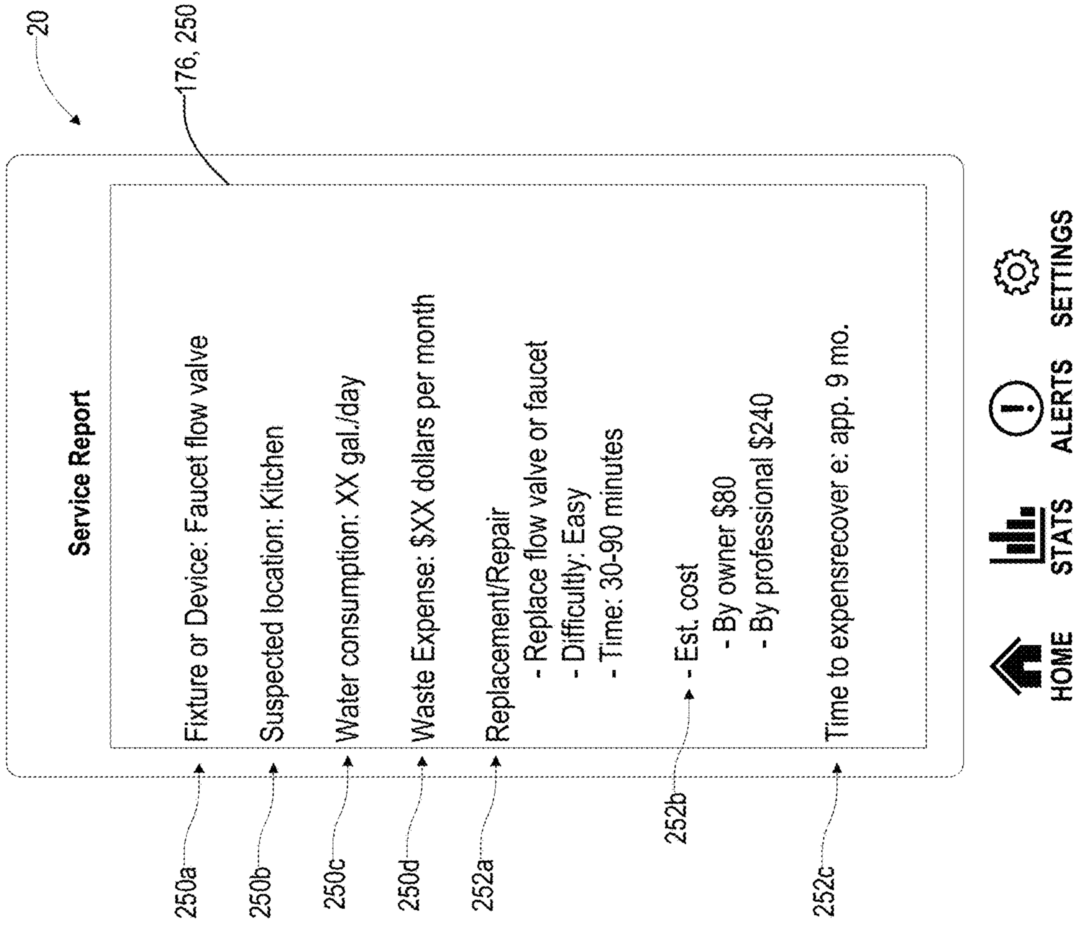
FIG. 6 is a diagram demonstrating an exemplary service report generated by a monitoring and control system.

Referring now to FIGS. 5A-5D, a method 130 for monitoring system activity relating to the operation of one or more of the consumption implements 30 as well as the inherent operation of the fluid or water passing through the supply line 12 is described in reference to a plurality of subroutines, exemplarily demonstrated in FIGS. 5B, 5C, and 5D. In general, the method 150 may operate to monitor flow rates, temperature, pressure, and various other related activity corresponding to the operation of the consumption implements 30 or any other activity that may affect the fluid passing through the monitoring apparatus 14 via the supply line 12. As shown in FIG. 5A, the method 150 may be initiated in response to the activation of the monitoring system 10 (132). Following the activation of the system 10, a controller of the monitoring apparatus 14 may monitor and report various water supply properties that may be detected and identified by sensor data reported by the sensors 22 (134). As the system 10 operates, the water supply properties (e.g., pressure, flow rate, temperature, etc.) associated with the operation of the consumption implements 30 may be tracked and stored in a database, which may be communicated over the device network 16. As previously discussed, the sensor data detected by the sensors 22 may be monitored by the monitoring apparatus 14 to identify and train various temperature, pressure, and/or flow rate profiles associated with the typical operation of the supply line 12 and the corresponding consumption implements 30.

Over time, the system 10 may generate and tune a variety of implement-specific consumption profiles for each of the consumption implements 30 for corresponding classes of implements. The consumption profiles may typically be in the form of flow rate profiles identifying corresponding flow rate values, rates of change of flow rates over time, and durations of the corresponding flow rate event curves that may be representative of the operation of each of the consumption implements 30. Throughout operation of the system 10, the sensor data reported by the sensors 22 may be attributed to specific consumption implements 30 connected to the supply line 12 and identified as corresponding to representative operation (e.g., flow rates, duration, changes in flow rate and fluctuation, activation and deactivation curves, etc.) that may be indicative of the classes and categories associated with each of the consumption implements 30. In this way, the system may attribute the fluid flow passing through the supply line 12 with specific implements of the consumption implements 30 to monitor and document the corresponding operation and fluid usage attributed to each of the consumption implements 30. Additional examples of methods for detecting the operation of consumption implements 30 and attributing the flow rate data to specific implements in connection with a common supply line is provided in U.S. Patent Publication No. 2022/0051351A1, the disclosure of which is incorporated herein by reference in its entirety.

Once the representative operation of the consumption implements 30 is identified and documented by the system 10, the controller of the monitoring apparatus 14 may continue the method 150 by comparing the sensor data to established or preconfigured values of the water supply properties (136). The various subroutines and operations of the method 130 primarily relate to the response of the system 10 to water supply anomalies or malfunctions identified based on the on-going monitoring and the comparison in step 136 (138). Following the identification of one or more anomalies based on the sensor data reported by the sensors 22, the method 130 may continue by initiating a virtual assistant 170 (FIG. 5B) to communicate various aspects of the anomaly in step 140 and access an anomaly database to determine potential causes of the anomaly (142). Further detailed aspects focusing on the operation of the virtual assistant 170 are described in reference to FIG. 5B and the assessment of the anomaly and corresponding corrective action are described in FIGS. 5C and 5D. In various examples, the method 130 may correspond to and include a progressive maintenance feedback routine as identified in step 144 that may provide for interactive communication with a user of the system 10 to identify and execute one or more corrective actions to repair, correct, or otherwise remediate the anomalies indicated by sensor data.

Referring now to FIG. 5B, the operation of the virtual assistant 170 introduced in step 140 is described in reference to subroutine 150, including representative steps 152-166. As previously discussed in reference to FIG. 5A, in step 138, the method 130 may identify an anomaly based on the sensor data and, in step 140, may initiate the virtual assistant demonstrated on a display of the mobile device 20. Once initiated in step 152, the method or subroutine 150 may output a message indicating the anomaly related to one or more of the consumption implements 30 and/or otherwise related to a temperature, pressure, or other operating properties associated with a fluid supply provided by the supply line 12 (154). The message output by the virtual assistant 170 may be communicated via a computer-generated voice and/or representative humanoid rendering or graphic representation 172 that may be rendered to appear as though a virtual human presence is communicating the information related to the operation of the monitoring system 10. For example, as demonstrated in FIG. 5B, the virtual assistant 170 is shown announcing "The identified anomaly is likely related to a leak in one or more faucets on the second floor." This and similar messages may be output as audible communications, which may also be supplemented by realistic renderings of the graphic representation 172 demonstrating facial expressions and movements of the lips and facial features representative of verbal communication of the messages associated with the subroutine 150. In this configuration, the virtual assistant 170 may provide for a lifelike interactive experience for a user of the monitoring system 10, which may communicate the nature of the anomalies identified by the monitoring apparatus 14 in an accessible and user-friendly format.

Following the message output by the virtual assistant 170, the method 150 may continue to request or prompt the user of the mobile device 20 for a response, feedback, and/or questions (156). In various implementations, the response may be provided verbally by the user 26 or in the form or a gesture (e.g., recorded by a camera of the mobile device 20) or input to the display of the mobile device 20. The feedback or response of steps 156 and 158 may be in the form of an approval or acknowledgement of a question posed by the virtual assistant 170 to the user or may be a request for additional information or question related to the message output in step 154. Throughout the operation of the subroutine 150 and particularly following the output of the message in step 154, the routine 150 may monitor a microphone, camera, and a user interface of the mobile device 20 to record and interpret or process the response or feedback associated with step 156 (158). The voice recognition may be undertaken by one or more processors or controllers of the monitoring system 10, which may correspond to the remote server 68 or local processors of the mobile device 20. In general, voice recognition may be accomplished by recording analog audio associated with the speech of the user 26, converting the analog audio to a digital format, and identifying or interpreting the language associated with the user's spoken dialog by a pattern recognition function. Based on the voice recognition procedure, the software operating on the mobile device 20 may identify and interpret the response from step 156.

Once the response is received and interpreted, the method 150 may continue to determine whether the response from step 156 indicates that the user understands the issue or confirms the message output in step 154 or if further dialog or requests (e.g., questions, comments, etc.) are warranted based on the user response interpreted in step 158 (160). If further dialog is determined to be warranted, the method 150 may return to step 154 to continue the dialog between the virtual assistant 170 and the user 26. If in step 160 it is determined that no further dialog is prompted or necessary and the communication is resolved, the method 150 may continue to report the user response and document any corresponding plan or corrective action in step 162. For example, if the anomaly communicated in step 154 includes a proposed resolution (e.g., modification to one or more of the consumption implements 30 or a conditioning device associated with the water supplied by the supply line 12), the method 150 may continue to document or save the proposed corrective action in one or more menus of a software application 174 as exemplified by the user interface 176 depicted on the display of the mobile device 20. In this way, the detected anomalies and corresponding corrective actions may be documented in a list or summary for follow-up by the user 26.

As shown on the user interface 176, a plurality of menu options may be presented as icons 178 configured to access a variety of menus associated with the software application 174. One or more of the menu options associated with the user interface 176 may display the proposed corrective action and may further include a scheduled time proposed for the repair that may be saved in a memory or database (e.g., the remote server 68) in communication with the mobile device 20 and software application 174. The proposed time for repair or installation may also be accompanied by a proposed service technician or plumber that may be identified in a service provider database local to the system 10 and/or the mobile device 20. In this way, the monitoring system 10 may provide for interactive communication with one or more users 26 via the virtual assistant 170 to communicate one or more anomalies related to the operation of the consumption implements 30 and/or water supply communicated through the supply line 12 as well as various proposed corrective actions as further discussed in reference to FIGS. 5C and 5D.

Following the documentation of the proposed corrective action in relation to the anomaly identified in step 162, the method 150 may continue by adding one or more scheduling reminders in the database associated with the software application 174 (164). The scheduling reminders may include one or more requests to purchase replacement parts or equipment, contact a professional (e.g., plumber, appliance technician, etc.), and/or complete a repair or replacement proposed by the corrective action. Such scheduling reminders may be communicated to one or more connected calendar or scheduling applications (Google calendar, Outlook calendar, etc.) to assist in providing reminders to the user 26 of the mobile device 20. As later discussed in reference to FIGS. 5C and 5D, in some implementations, the method 130 and associated routines 150, 190, 220 may further access one or more databases to identify potential sources for replacement parts and/or local contacts for professional services (e.g., plumbers, technicians, etc.). In this way, the subroutine 150 may provide for an intuitive communication method to interact with the user 26 and provide a proposed corrective action, including the purchase of potential replacement parts or additional equipment and the contact information for local professionals, to assist in correcting or remediating the detected anomaly. Upon completion of the interaction with the user 26, the method 150 may complete the communication subroutine in step 166 and return to the monitoring method 130.

Referring now to FIGS. 5A and 5C, as previously noted in step 144, the method 130 may initiate a maintenance feedback routine to identify the corresponding anomalies and/or corrective actions discussed in reference to FIG. 5B. As demonstrated in FIG. 5C, a maintenance feedback routine is demonstrated as a method 190 that may process the data communicated and captured by the sensors 22 to identify the failure mode or anomaly associated with the consumption implements 30 or water supply communicated through the supply line 12. As noted in step 142 of FIG. 5A, the anomaly database may be accessed to determine whether the sensor data associated with the operation of the monitoring apparatus 14 is indicative of one or more conditions for anomalies that may be detected by the system 10 and corresponding corrective actions as later discussed in FIG. 7.

Accordingly, following steps 142 and 144 from FIG. 5A, the method 190 shown in FIG. 5C may initiate the maintenance feedback routine in step 192 and determine whether the failure mode or anomaly has been identified in the anomaly database in step 194. If the failure mode or anomaly associated with the operation of the system 10 is identified in step 194, the method 190 may continue to step 196 to output a message communicating the anomaly to the user 26. Further, in steps 198 and 200, the method 190 may identify potential corrective actions (e.g., maintenance, fixture repair or replacement, conditioning device or filtration installation/replacement, etc.) and output a message to the user 26 communicating the proposed corrective action. As indicated in step 202, the method 190 may process the communication with the user 26 by following the method 150 as exemplified by the interaction with the virtual assistant 170 exemplified in FIG. 5B.

If in step 194 the failure mode or anomaly is not identified in the anomaly database, the method 190 may continue to step 204 to output a message requesting or prompting feedback from the user 26. The feedback from the user 26 may be processed by the communication subroutine 150, which may incorporate the communication via the virtual assistant 170, as exemplified in FIG. 5B (206). In the example of the communication of step 206, the method 190 may request user feedback (208) regarding information that may not be directly detected by the sensors 22 or may otherwise require user verification due to the information provided from the sensors 22 of the monitoring apparatus 14 being ambiguous or otherwise failing to correspond to one or more failure modes or anomalies. For example, ambiguous sensor data may not reach a level of severity (e.g., outside an acceptable range of threshold values) to be indicative of a warning or failure condition. However, trends in the sensor data (e.g., increased pressure, flow rates, accumulative flow, temperature, etc.) may be informative of various defects, malfunctions, or issues with the water supply and/or the consumption implements 30 when accompanied by human observations. Accordingly, during the interactive communication subroutine 150, the monitoring system 10 may request information from the user 26 (e.g., via the virtual assistant 170 on the mobile device 20), which may clarify the nature of an anomaly, such that it may be identified in the user database in step 210 for potential corrective actions.

Examples of anomalies that may not be directly identified based on the data provided by the sensors for the inherent operation of the monitoring apparatus 14 (e.g., valve operation, power supply, etc.) may include cases where the sensor data indicates variations in pressure, temperature, and/or flow rates that are not characteristics of one or more anomalies but otherwise indicated changes from historic operating trends. For example, changes in the operation of a faucet 34 or toilet 32 may gradually increase in leak or intermediate water-flow events that may not exceed one or more thresholds necessary to indicate leak events based on the detection thresholds associated with the sensor data alone. In such cases, the system 10 may review the trends of water usage as well as pressure and temperature associated with the operation of the system 10 in connection with the supply line 12 and the various consumption implements 30 to identify one or more trending values that may have changed from normal operating conditions as historically documented but is not yet in excess or decreased below a corresponding threshold to indicate a specific anomaly.

Such trends in the supply properties associated with the water supply in the supply line 12 may be communicated to the user 26 via the communication routine 150 to request user feedback regarding the operation of one or more of the consumption implements 30 or classes of consumption implements that may correspond to the failure mode or anomaly that could otherwise not be identified directly from the anomaly database (e.g., not identified by the sensor data alone according to the acceptable operating range). In such cases, the user 26 may respond with information regarding observations or manual tests of the consumption implements 30 in connection with the system 10 to determine whether the changes in the historic supply properties identified by the sensors 22 are indicative of failures or the degradation of the operation of one or more of the consumption implements 30 that may not otherwise be identified by the sensory data alone. In this way, the monitoring system 10 may apply the maintenance feedback routine 190 to identify failure modes and/or anomalies associated with the operation of the consumption implements 30 in communication with the supply line 12 that may not otherwise be identified strictly based on the information communicated from the sensors 22. Accordingly, if the failure mode or anomaly is identified based on the user feedback in step 210, the method 190 may continue to step 196. If the failure mode is not identified in step 210, the system 10 may output a message that the failure cannot be isolated or identified to one or more of the consumption implements 30 or the water supplied through the supply line 12 (212). In cases where the failure cannot be isolated, the system 10 may output a message (e.g., via the virtual assistant 170) suggesting contact information for a local plumber that may be associated with a location of the user 26 and the mobile device 20 to request additional support in step 214. Following the completion of the maintenance feedback routine 190, the operation of the system 10 may return to the monitoring method 130 demonstrated in FIG. 5A.

Referring now to FIG. 5B, in some implementations, the monitoring system 10 may further incorporate a user-initiated diagnostic routine that is exemplified by the method 220. In contrast with the method 190, the method 220 may be initiated in step 222 based on a request by the user 26 that may be provided by the software application 174 on the mobile device 20 or a similar computerized device. Accordingly, the method 220 may be initiated in response to a request from a user 26 to test for an anomaly or malfunction in relation to one or more consumption implements 30 and/or, more generally, in relation to the temperature and/or pressure of the water supplied through supply line 12 (222). Once initiated, the communication subroutine 150 may prompt the user or otherwise identify one or more of the consumption implements 30 (e.g., suspected fixtures or implements) identified by the user 26 as potentially malfunctioning in step 224. If the consumption implement 30, pressure, temperature, or other aspects of the water supply via the supply line 12 is identified in step 224, the monitoring system 10 may initiate a system scan (226) and instruct the user to activate or proceed through a troubleshooting process for the suspected malfunctioning device or consumption implement 30 (228). Based on the system scan and activation of the consumption implement 30 suspected of malfunctioning in steps 226 and 228, the system 10 may continue to step 230 to process the corresponding data captured by the sensors 22 to determine if the operation is symptomatic of abnormal operation associated with the corresponding suspected consumption implement of the plurality of consumption implements 30 in connection with the supply line 12.

In response to the evaluation of the sensor data in step 230, the method 220 may continue to determine if a potential anomaly is identified in relation to the operation of the suspected fixture or consumption implement 30 in step 232. Similar to the operation discussed in reference to the user feedback harvested by the system 10 in step 208 of the maintenance feedback routine 190, the method 220 may determine if the sensor data is symptomatic of a potential anomaly that may not otherwise trigger a failure notification associated with the operation of the suspected fixture because the sensor data (e.g., pressure, accumulative fluid usage, flow rate, temperature, duration and timing of operation, etc.) is not yet in excess of the corresponding thresholds necessary to trigger a failure notification by the monitoring apparatus 14. Such operation may ensure that the system 10 may provide for automated identification of system failures and further provide for user assisted inspection of one or more of the consumption implements 30 or the properties of the fluid supply delivered by the supply line 12. If an anomaly is identified in step 232, the method 220 may continue to step 234 to identify potential corrective actions (234) and initiate the interactive communication subroutine 150 in FIG. 5B to communicate the corrective actions to the user 26 (236). If the potential anomaly is not identified in step 232, the system may output a message suggesting contact information for a certified local plumber identified based on the location of the mobile device 20 and/or the system 10 to further evaluate the system.

In some cases, the user request received in step 222 may not include an identification of the suspected fixture or consumption implement 30 associated with a malfunction or failure. In such cases, the system 10 may prompt or receive from the user 26 an indication of a time that the potential failure or anomalous behavior in relation to the water supply associated with the supply line 12 in step 240. The system 10 may then proceed to step 242 and initiate a system scan over a time range corresponding to the time identified by the user 26. Based on the sensor data over the corresponding range of time, the system 10 may similarly identify temperature data, pressure data, and/or flow rate data that may correspond to the specific flow rate profiles of one or more of the consumption implements 30 that does not exceed a minimum or a maximum threshold but may differ from historic operation. Such a determination may be identified by processing the sensor data in step 230 as previously discussed to identify a potential anomaly in step 232. In this way, the method 220 may provide for a user-initiated scan of the system to determine whether anomalous operation in relation to one of the consumption implements 30 and/or the pressure, temperature, or other properties of the water communicated through the supply line 12 were symptomatic of one or more anomalous or failure-related conditions detected by the system 10 but not in excess of one or more detection thresholds.

In some cases, the method 220 may be notified by the user 26 in step 222 of a potential type of anomalous activity related to the water supply through the supply line 12. In step 244, the method 220 may initiate an evaluation to determine if one or more specific types of anomalous operation can be identified by the data provided by the sensors 22 of the system 10. Examples of anomalous conditions that may be identified by the user 26 but not associated with one or more of the consumption implements 30 may include variations in pressure, water temperature, flavor, discoloration, operation of the monitoring apparatus 14, or other aspects. In response to the request in step 244, the system 10 may initiate a scan of the sensor data provided by the sensors 22 or conditions or supply properties associated with the water supply communicated through the supply line 12 that may correspond to the anomaly type specified by the user in step 244 (246). Once the corresponding sensor data related to the anomaly type is identified, the system 10 may process the sensor data in step 230 to identify if the sensor data is symptomatic of the corresponding anomaly but not in excess of one or more of the alert or notification thresholds indicative of a failure as previously discussed. Accordingly, the method 220 may provide for advanced user interaction with the monitoring system 10 to assist in the diagnosis and potential repair or maintenance of the consumption implements 30 or, more generally, the water quality or fluid supply provided by the supply line 12. As previously discussed, the system 10 may include one or more water quality sensors 22*d* that may facilitate the detection of water quality parameters.

As previously discussed, the system 10 may provide for the notification or communication of a potential failure or anomaly in relation to the consumption implements 30 and the pressure or temperature associated with the water communicated through the supply line 12. In some cases, the corresponding corrective actions and feedback provided to the user 26 may be communicated by the virtual assistant 170. Additionally, as demonstrated in FIG. 6, a service report 250 may be generated by the system and displayed on the user interface 176 of the mobile device 20. In the example shown, the service report 250 may include a failure indication 250*a* of the consumption implement 30, a location or name 250*b* of the consumption implement 30, a consumption indication 250*c*, and/or an expense indication 250*d*. The indications 250*c*, 250*d* may correspond to the waste (e.g., gallons/liters of water per day) and corresponding expense (e.g., dollars per month) of the waste over a predetermined time. Accordingly, service report 250 may communicate the nature of a failure or anomalous operation of one or more of the consumption implements 30 in communication with the supply line 12 and report the specific device and corresponding impact in terms of expense to the user 26.

In some implementations, the service report 250 may provide further notifications, including a repair or replacement instruction notification 252*a*, an estimated repair or replacement cost notification 252*b*, and/or a return on investment or payoff notification 252*c*. The replacement or repair notification 252*a* may include an identification of a replacement part, component, and/or device for installation that may correct or remediate the anomalous behavior leading to the failure notification. For example, the replacement or repair notification 252*a* may include a specific part, device, or component that needs to be replaced or repaired, an associated difficulty, and a time required to effectuate the repair. The cost estimation 252*b* may include notification of the corresponding expense associated with the parts, fixtures, and/or devices (e.g., available via a local or online distributor) that may be purchased by the owner and a comparative cost for a professional to repair or replace the apparently failing device or consumption implement 30. In addition to the estimated cost for the professional repair or installation, the system 10 may maintain a database of technicians or plumbing professionals in relation to the geographic location of the system 10 and/or the mobile device 20 and propose one or more contacts to provide the professional services to inspect, repair, and/or replace the suspicious consumption implement 30, and/or other aspects of the water supply provided through the supply line 12. In this way, the system 10 may provide for a variety of useful features to assist an owner of supervisor of the property associated with the supply line 12 to repair or maintain various aspects of the consumption implements 30.

Referring now to FIG. 7, as previously discussed, the system 10 may monitor various inputs provided by the sensors 22 and/or the inherent operation of one or more features of the monitoring apparatus 14 (e.g., the valve 24, network communication, etc.) to monitor and identify the anomalous operation described herein. FIG. 7 demonstrates a response table 254 providing a variety of exemplary conditions that may be detected based on inputs provided by the monitoring system 10. For example, in some cases, the system 10 may detect increases or decreases in pressure associated with the water supply provided by the supply line 12. Increased variations in pressure or spikes may be indicative of an unstable fluid supply and a corresponding corrective action identified by the system 10 may include the repair and/or installation of a pressure regulator to reduce high pressure events communicated through the supply line 12. Alternatively, if the system 10 identifies variations in pressure that decrease below a supply threshold, a corrective action in the form of a repair or installation of a booster pump may be suggested by the system 10. Such a corrective action may improve user comfort and limit low pressure variations attributed to the operation of the consumption implements 30.

In some implementations, the sensor data provided by the temperature sensor 22*c* may be monitored by the system to identify temperature variations and corresponding corrective actions. For example, if the supply water provided by the supply line 12 is below a freeze warning limit (e.g., 2° C.), a proposed corrective action provided by the system 10 may include an instruction to insulate or apply heat tape to a portion of the supply line 12. Such a corrective action may mitigate the risk of potential freezing of the supply line 12. Additionally, the system 10 may alert the user 26 and provide notifications in relation to increased temperature events (e.g., in excess of 18° C.) that may be indicative of potential contamination or corruption of the water provided by the supply line 12. In such cases, the system 10 may suggest a corrective action of treating or disinfecting the water supply provided by the supply line 12 via a chemical disinfection or treatment to cool the supply water to prevent infection. Accordingly, the system 10 may provide for the detection of various temperature-related conditions and corresponding corrective actions based on the monitoring of the sensor data provided by the sensors 22.

In some cases, the flow sensor or fluid sensor 22*b* may be monitored to identify one or more conditions related to the failure of one or more of the consumption implements 30 and/or an excess water consumption warning corresponding to the total usage of the consumption implements 30 in connection with the supply line 12. In cases where excess water consumption is correlated to a specific one of the consumption implements 30 or a class of the consumption implements 30, the system may identify the corresponding consumption implements 30 via the representative flow profiles and communicate a notification identifying the corresponding consumption implements 30 to the user 26. The notification to the user 26 may include a repair or replacement instruction for the consumption implement 30 that may assist the user 26 in identifying the corrective action required to limit the excess water consumption identified. Additionally, the corrective action may include a proposal to install low flow or limited volume consumption implements 30 (e.g., faucets, shower heads, toilets, etc.) As previously discussed in reference to the service report 250, a return on investment notification 252*c* and/or cost notification 252*b* may be provided with the corrective action to assist the user 26 in determining either the justification and/or the expense associated with the repair or replacement suggested by the corrective action.

In some cases, the excess water consumption detected based on the flow rate data communicated by the fluid sensor 22*b* may similarly be detected as excess consumption attributed to the consumption implements 30 in combination. In response to an excess total water consumption condition detected, the system 10 may propose the corrective action of setting household conservation goals and corresponding alerts to notify the user 26 of usage trends. Additionally, the corrective action may propose the installation of multiple low-flow or limited volume consumption implements 30. The conservation goals may be communicated in combination with one or more improvement or saving notifications that may identify an approximate water savings and corresponding cost savings over predetermined intervals to assist the user 26 in justifying the conservation of the water. As previously discussed, the corresponding expenses and costs of various aspects, including a return on investment of the corrective actions, may be identified by the system 10 with rates and cost savings attributed to the specific geographic location of the system 10 and/or the mobile device 20. For example, water usage rates and taxes may vary widely in different geographic regions, municipalities, etc. Accordingly, the location of the system 10 can be identified based on a location of an internet service provider, GPS location services (e.g., via the mobile device 20), and/or a manual identification of the location of the system 10 that may be attributed to a profile of the user 26 for the software application 174.

Additional conditions that may be detected by the system 10 include valve control failures that may be related to the operation of the monitoring apparatus 14 and connection failures that may be associated with the device network 16 and corresponding wired and/or wireless transceivers of the system 10. For example, a failure of a valve actuation of the monitoring apparatus 14 may prompt the system 10 to instruct the user 26 to repair or replace the valve 24 and/or the monitoring apparatus 14. Similarly, a failure of a communication over the device network 16 may prompt the system 10 to instruct the user 26 to verify the network communication configuration and/or replace one or more of the monitoring device, network adaptors, and/or wireless hubs or routers associated with the operation of the device network 16. Accordingly, the system 10 may provide for the monitoring of a variety of potential inputs to identify corresponding conditions and corrective actions to improve and/or repair the operation of one or more of the consumption implements 30 and/or the supply properties associated with the water communicated by the supply line 12.

Figure 8:
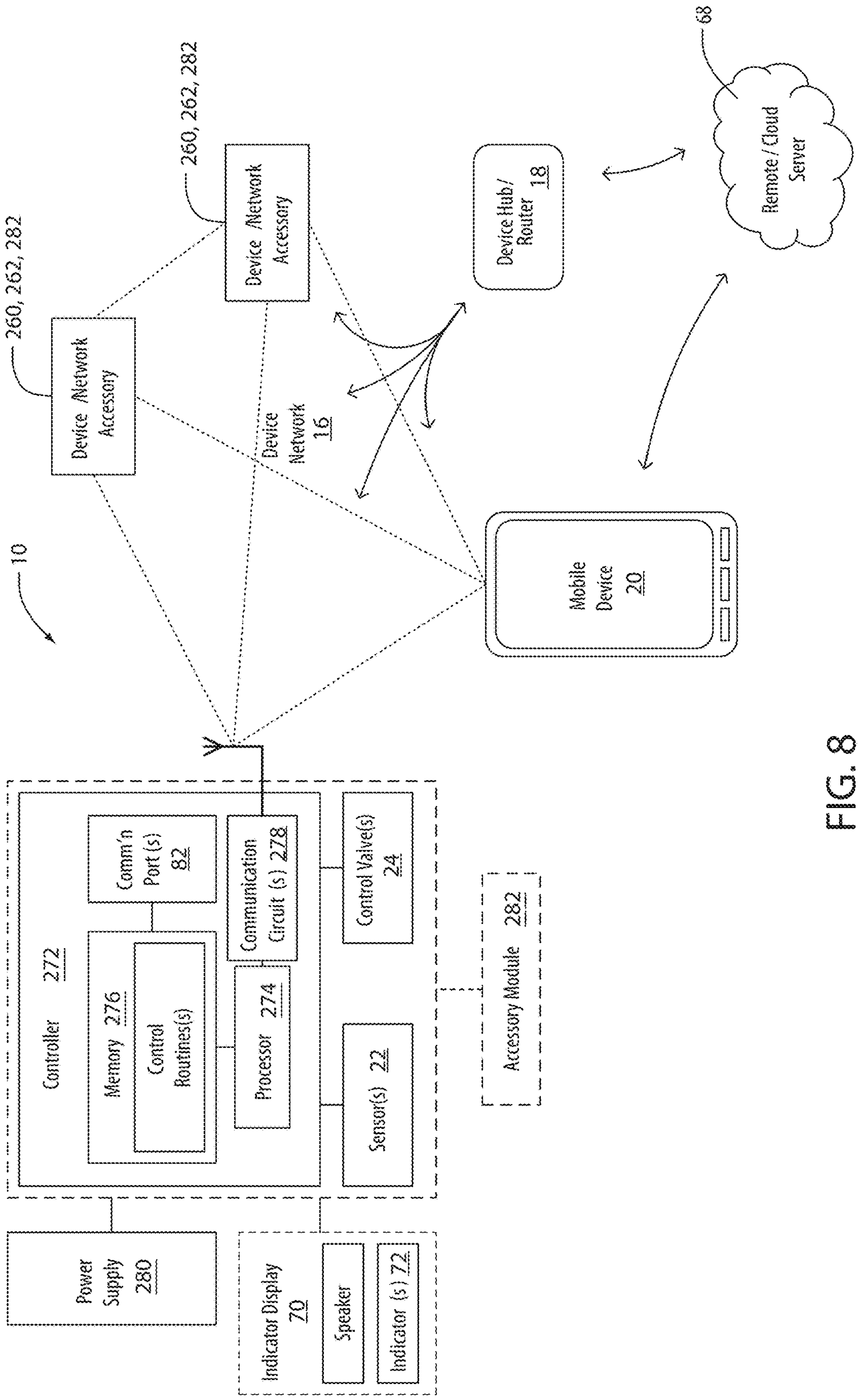
FIG. 8 is a symbolic block diagram demonstrating a monitoring system comprising a monitoring and control apparatus in accordance with the disclosure.

Referring to FIG. 8, a block diagram of the monitoring apparatus 14, or more generally the monitoring system 10, is shown incorporated as a node of a device network 16. As shown, the device network 16 may include a variety of electronic devices which may be configured to communicate over various wired or wireless communication protocols. In the example shown, the monitoring apparatus 14 is accompanied by a plurality of wireless or network accessories 260 (e.g., smart home devices, home security systems, etc.) and in communication with the mobile device 20 via the device network 16. The device network 16 may be implemented as a mesh or internet of things (IoT) network, wherein each of a plurality of connected devices 262 (e.g., the monitoring apparatus 14, the network accessories 260, the mobile device 20, etc.) is operable to communicate directly with one another via the device network 16. Additionally, the device network 16 may utilize a device hub 18 or router through which the connected devices may be in communication with one another as well as a remote server 68. The device hub 18 may correspond to a smart device hub, a wireless router, and/or a wired communication network. Accordingly, the device network 16 permits coordinated control and programming of each of the connected devices 262 via a hierarchical control structure and/or via a distributed control structure.

The monitoring apparatus 14 provides for programmable operation via a controller 272 configured to control various components and/or integrated circuits to provide for the control of the valve 24 in response to the sensors 22. Additionally, the operation provides for operation based on controls communicated via the user interface 176 of the mobile device 20. The controller 272 may include various types of control circuitry, digital and/or analog, and may include a processor 274, microcontroller, application-specific integrated circuit (ASIC), or other circuitry configured to perform various input/output, control, analysis, and other functions as described herein. The controller 272 further includes a memory 276 configured to store one or more routines as discussed herein. The memory 276 may be implemented by a variety of volatile and non-volatile memory formats. One or more communication circuits 278 of the monitoring apparatus 14 may be incorporated with the controller 272 or in communication with the controller 272 to permit communication via the device network 16 or various protocols of wireless or wired network communication.

The controller 272 of the monitoring system 10 receives power from a power supply 280, which may further be configured to supply power to the sensors 22, the valve 24, and the indicator display 70. The power supply 280 may include one or more transformers, rectifiers, capacitors, and various electrical components to condition the power for the operation of the monitoring apparatus 14. In addition to the sensors 22 and the valve 24, the monitoring apparatus 14 may further comprise one or more accessory module(s) 282. The accessory modules may include a variety of devices, which may be controlled by instructions communicated from the controller 272 via the communication circuit 278. In some implementations, the accessory module(s) 282 may correspond to one or more remote sensors, valves, user interfaces, etc. in communication with the controller 272 via the communication circuit 278. In such implementations, the controller 272 may operate as the central controller 66 as previously discussed in reference to FIG. 2. Accordingly, the controller 272 may be configured to receive sensor information from remote sensors or accessory modules 282 identifying sensor data (e.g., flow rate, pressure, temperature, etc.) for various supply lines distributed throughout the building 48. The sensor data from the remote sensors or accessory modules 282 may be communicated to the controller 272 (e.g., the central controller 66). Based on the sensor data, the controller 272 may communicate instructions to each of the accessory modules 282 via the device network 16. For example, the controller 272 may communicate instructions to a plurality of valves to achieve zone control or more generally, coordinated control of the connected devices 262. The accessory module(s) 282 may include one or more pumps (e.g. sump pumps, well pumps, etc.), valves, sensors, actuators, and a variety of other accessories. Accordingly, the disclosure provides for a scalable and flexible system that may be utilized to monitor and control the delivery and drainage of the fluid supplied to and expelled from the building 48, multiple buildings, and/or a complex of buildings or structures.

Still referring to FIG. 8, the device network 16 may be implemented via one or more direct or indirect, non-hierarchical communication protocols, including but not limited to Bluetooth®, Bluetooth® low energy (BLE), Thread®, Z-Wave®, ZigBee®, Matter, etc. In this configuration, the connected devices or modules 260, 262, 282 may operate via a decentralized control structure. Additionally, the device network 16 may correspond to a centralized or hierarchical communication interface wherein one or more of the connected devices 262 communicate via the device hub 18 (e.g., a router or communication routing controller). Accordingly, the device network 16 may be implemented via a variety of communication protocols in various combinations, including but not limited to, global system for mobile communication (GSM), general packet radio services (GPRS), Code division multiple access (CDMA), enhanced data GSM environment (EDGE), fourth-generation (4G) wireless, fifth-generation (5G) wireless, Bluetooth®, Bluetooth® low energy (BLE), Wi-Fi®, world interoperability for microwave access (WiMAX), local area network (LAN), Ethernet, etc. By flexibly implementing the device network, the monitoring apparatus 14 may be in communication with one or more of the connected devices 262 and the remote server 68 directly and/or via the device hub 18.

The mobile device 20 may correspond to a mobile communication device (e.g., cell phone, tablet, smartphone, etc.). In some embodiments, electronic communication devices may include other mobile electronic devices, such as laptops, personal computers, and/or other devices. The mobile device 20 may be configured to run various software applications configured to control the settings of the monitoring apparatus 14, the accessory module(s) 282, and communicate control parameters for connected devices 262 as identified via the onboard software applications or based on instructions received from the remote server 68. Software operating on the mobile device 20 may enable the control of multiple monitoring apparatuses and/or discrete systems, which may be separately monitored and tracked for operation and consumption. Accordingly, the mobile device 20 in combination with the monitoring apparatus(es) 14 may be configured to facilitate a variety of coordinated control routines including scheduled operations and activities for the connected devices 262, which may reside in a common location and/or be distributed over a variety of locations.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

According to some aspects of the disclosure, a water supply monitoring system in connection with a supply line comprises a plurality of sensors configured to detect supply properties including at least one of a water quality, temperature, flow rate, and a pressure in the supply line. A controller is provided configured to receive the supply properties from the sensors and compare the supply properties to a plurality of detection metrics. In response to a comparison of the supply properties relative to the detection metrics, the controller identifies an anomaly of a fluid supply communicated through the supply line or at least one consumption device of a plurality of consumption devices in fluid communication with the supply line. The controller then identifies a corrective action in response to the anomaly, wherein the corrective action includes at least one of a repair of the at least one consumption device, a replacement of the at least one consumption device, an installation or replacement of a conditioning device configured to condition the fluid supply, and/or a treatment of the fluid supply.

According to various aspects, the disclosure may implement one or more of the following features or configurations in various combinations:

- the controller is further configured to report the corrective action via a user interface in communication with the controller;
- the corrective action is reported via a voice assistant or simulated humanoid video assistant configured to audibly communicate the anomaly and the corrective action;
- the supply properties include the flow rate in the supply line and the controller is further configured to determine a consumption classification or a specific consumption device associated with the anomaly;
- the specific consumption device is determined by the controller by comparing the flow rate to a flow rate profile of the specific consumption device, wherein the flow rate model defines a plurality of flow rate characteristics of the specific consumption device;
- the controller is further configured to identify a financial cost associated with the anomaly over a predetermined period based on the flow rate (e.g., expense of water losses);

the financial cost is calculated by the controller based on a utility rate of the fluid supply in a geographic region of the supply line;

the controller is further configured to identify (from a table or database) or request an estimate (from a provider) for a corrective action that remediates the anomaly;

the controller is further configured to identify a service provider associated with the corrective action in a geographic region of the supply line;

the corrective action is communicated to the service provider in response to a confirmation to request the corrective action via the user interface;

the controller is further configured to calculate a term for a return on investment for the estimate to meet or exceed financial cost and report the term of the return on investment via a user interface in communication with the controller;

the controller is further configured to identify a property value for a corrective action that remediates the anomaly;

the value is identified by accessing a database or server comprising real estate information for a geographic region of the supply line; and/or the supply properties comprise the temperature of the fluid supply at the supply line and the corrective action comprises at least one of an installation of a heater in connection with the supply line, a disinfection system configured to treat the fluid supply, and a thermostatic mixing apparatus.

According to some aspects of the disclosure, a method for identifying a corrective action for a water supply line of a water supply system comprises receiving a request for a diagnostic evaluation of an operating property of the water supply system, then receiving at least one fluid supply value of a fluid supply provided by the water supply line from a plurality of sensors in communication with the water supply line. The method then compares the fluid supply value to a plurality of detection metrics related to the operating property. Based on the comparison, the method detects one or more anomalies of the water supply system.

According to various aspects, the disclosure may implement one or more of the following features or configurations in various combinations:

the operating property comprises a flow rate or flow accumulation of at least one water consumption device;

the operating property comprises at least one of a temperature and a pressure of the fluid supply;

detecting reference data demonstrating typical system operating values for the operating property of the water supply system over a period preceding the request for the diagnostic evaluation;

in response to the request for the diagnostic evaluation, reviewing the fluid supply value relative to the typical system operating metrics;

identifying a change or trend in the fluid supply value relative to the typical system operating values;

in response to the change or trend in the fluid supply value converging on one or more of the plurality of detection metrics, reporting a potential failure of a devices associated with the operating property; and/or the request is received as a voice request to a user interface of a mobile device.

According to additional aspects of the disclosure, a water supply monitoring system in connection with a supply line comprises a plurality of sensors configured to detect supply properties comprising at least one of a water quality, temperature, flow rate, and a pressure in the supply line. A controller is provided which is configured to receive the supply properties from the sensors and compare the supply properties to a plurality of detection metrics. In response to a comparison of the supply properties relative to the detection metrics, the controller identifies an anomaly of a fluid supply communicated through the supply line or at least one consumption device of a plurality of consumption devices in fluid communication with the supply line. In response to the anomaly being identified, the controller identifies a corrective action configured to correct the anomaly and output a professional service contact to facilitate the corrective action in a local region of the supply line.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A water supply monitoring system in connection with a supply line, the system comprising:

a plurality of sensors configured to detect supply properties comprising at least one of a water quality, a temperature, a flow rate, and a pressure in the supply line, wherein the plurality of sensors are configured to continuously monitor the supply properties and transmit the supply properties to a controller; and the controller configured to:

receive the supply properties from the sensors;

compare the supply properties to a plurality of detection metrics;

initiate an interactive communication subroutine, comprising:

communicating a message to a user, wherein the message includes a request to activate at least one consumption device in fluid communication with the supply line;

receiving an activation supply property from at least one of the sensors in response to the user activating the at least one consumption device; and in response to at least one of a comparison of the supply properties relative to the detection metrics and the activation supply property, identify an anomaly of:

a fluid supply communicated through the supply line; or at least one consumption device of a plurality of consumption devices in fluid communication with the supply line; and identify a corrective action in response to the anomaly, wherein the corrective action includes at least one of:

a repair of the at least one consumption device;

a replacement of the at least one consumption device;

an installation or replacement of a conditioning device configured to condition the fluid supply; and a treatment of the fluid supply.

2. The monitoring system according to claim 1, wherein the controller is further configured to:

report the corrective action via a user interface in communication with the controller.

3. The monitoring system according to claim 1, wherein the corrective action is reported via a voice assistant or simulated humanoid video assistant configured to audibly communicate the anomaly and the corrective action.

4. The monitoring system according to claim 1, wherein the supply properties include the flow rate in the supply line and the controller is further configured to determine a consumption classification or a specific consumption device associated with the anomaly.

5. The monitoring system according to claim 4, wherein the specific consumption device is determined by the controller by comparing the flow rate to a flow rate profile of the specific consumption device, wherein the flow rate model defines a plurality of flow rate characteristics of the specific consumption device.

6. The monitoring system according to claim 1, wherein the controller is further configured to:

identify a financial cost associated with the anomaly over a predetermined period based on the flow rate, wherein the financial cost is calculated by the controller based on a utility rate of the fluid supply in a geographic region of the supply line.

7. The monitoring system according to claim 1, wherein the controller is further configured to:

identify or request an estimate from a provider for a corrective action that remediates the anomaly.

8. The monitoring system according to claim 7, wherein the controller is further configured to:

identify a service provider associated with the corrective action in a geographic region of the supply line, wherein the corrective action is communicated to the service provider in response to a confirmation requesting the corrective action via the user interface.

9. The monitoring system according to claim 7, wherein the controller is further configured to:

calculate a term for a return on investment for the estimate to meet or exceed financial cost; and report the term of the return on investment via a user interface in communication with the controller.

10. The monitoring system according to claim 1, wherein the controller is further configured to:

identify a property value for a corrective action that remediates the anomaly, wherein the value is identified by accessing a database or server comprising real estate information for a geographic region of the supply line.

11. The monitoring system according to claim 1, wherein the supply properties comprise the temperature of the fluid supply at the supply line and the corrective action comprises at least one of an installation of a heater in connection with the supply line, a disinfection system configured to treat the fluid supply, and a thermostatic mixing apparatus.

12. The monitoring system according to claim 1, wherein the interactive communication subroutine includes communicating a message prompting the user to proceed through a troubleshooting process.

13. A water supply monitoring system in connection with a supply line, the system comprising:

a plurality of sensors configured to detect supply properties comprising at least one of a water quality, a temperature, a flow rate, and a pressure in the supply line, wherein the plurality of sensors are configured to continuously monitor the supply properties and transmit the supply properties to a controller; and the controller configured to:

receive the supply properties from the sensors;

compare the supply properties to a plurality of detection metrics; and initiate an interactive communication subroutine, comprising:

communicating a message to a user requesting feedback, wherein the message includes a request to activate at least one consumption device in fluid communication with the supply line;

receiving a response from the user; and receiving an activation supply property from at least one of the sensors; and in response to at least one of a comparison of the supply properties relative to the detection metrics, the activation supply properties, and the user feedback, identify an anomaly of a fluid supply communicated through the supply line or at least one consumption device of a plurality of consumption devices in fluid communication with the supply line; and in response to the anomaly being identified, identify a corrective action configured to correct the anomaly; and output a professional service contact to facilitate the corrective action in a local region of the supply line.

14. The monitoring system according to claim 13, wherein the interactive communication subroutine includes communicating a message to the user prompting the user to proceed through a troubleshooting process.

* * * * *